United States Patent
Relph

(10) Patent No.: US 12,516,493 B2
(45) Date of Patent: Jan. 6, 2026

(54) WORK MACHINE LIFTING ASSEMBLY

(71) Applicant: Great Plains Manufacturing, Inc., Salina, KS (US)

(72) Inventor: John M. Relph, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 238 days.

(21) Appl. No.: 18/359,653

(22) Filed: Jul. 26, 2023

(65) Prior Publication Data

US 2025/0034831 A1  Jan. 30, 2025

(51) Int. Cl.
*E02F 3/34* (2006.01)
*E02F 9/16* (2006.01)

(52) U.S. Cl.
CPC ............ *E02F 3/3414* (2013.01); *E02F 9/166* (2013.01)

(58) Field of Classification Search
None
See application file for complete search history.

(56) References Cited

U.S. PATENT DOCUMENTS

| | | | | |
|---|---|---|---|---|
| 2,818,296 | A * | 12/1957 | Brennan ................... | B66C 1/20 294/67.4 |
| 4,048,267 | A * | 9/1977 | Walker .............. | B01F 23/23105 285/283 |
| 8,894,115 | B2 * | 11/2014 | Lundman .................. | B66C 1/56 294/98.1 |
| 11,177,763 | B2 * | 11/2021 | Russell ................... | H02S 20/10 |
| 2017/0166427 | A1 * | 6/2017 | Grace ..................... | B66F 13/00 |
| 2020/0095750 | A1 | 3/2020 | Carlson et al. | |

FOREIGN PATENT DOCUMENTS

| | | |
|---|---|---|
| JP | 06-026068 A | 2/1994 |
| JP | 2004-143668 A | 5/2004 |
| JP | 2008-062771 A | 3/2008 |
| JP | 2010-065436 A | 3/2010 |

OTHER PUBLICATIONS

Elebiatv, Lifting of a Bobcat with a Unique Lifting Point | Smart Lifting Solutions | Elebia, https://www.youtube.com/watch?v=H10_IljinOSs, Nov. 1, 2017.
Viralhog, A Little Demolition || ViralHog, https://www.youtube.com/watch?v=gADvdpjz1qc, Nov. 1, 2017.
Wuero85, Crane pics out Bobcat from hole safely, https://www.youtube.com/watch?v=4IRL_VuUAxQ, Nov. 1, 2014.
Steven Tedder, 51) Crane Lifting CAT Skidsteer Onto Flatbed Trailer, https://www.youtube.com/watch?v=N89U3zqAe4g, Nov. 1, 2021.

(Continued)

*Primary Examiner* — Michael S Lowe
(74) *Attorney, Agent, or Firm* — Hovey Williams LLP; Kameron D. Kelly

(57) ABSTRACT

A work machine comprising a frame having laterally spaced sides and longitudinally spaced front and rear ends. The work machine additionally comprises at least one loader arms supported on the frame and shiftable relative to the frame between a raised position and a lowered position. The frame further comprises a pair of laterally spaced, longitudinally aligned lift eyes from which a full weight of the work machine can be suspended.

14 Claims, 24 Drawing Sheets

(56) References Cited

OTHER PUBLICATIONS

Filming Cork, Crane lifts bobcat out of ship, https://www.youtube.com/watch?v=gkCpGe7zF8A, Nov. 1, 2022.
RT-40 Operation and Maintenance Manual, Version: EN, Edition: May 2019, Part No. 0404-766 (US), Valid from Serial No. 00100 (RT-40), 95 pages, May 1, 2019.
Gehl, SL4640E, SL4640E (EU), Power2 (SN 312901 and Up), SL5240E, SL5240E (EU) Power2 (SN 432501 and Up), Skid-Steer Loaders Operator's Manual, Form No. 50950012/AP0811 English, Manitou Americas, Inc., West Bend, WI, Jan. 1, 2011.
PCT Search Report and Written Opinion dated Oct. 25, 2024 for related PCT Patent Application No. PCT/US2024/037628, 10 pages.

\* cited by examiner

WORK MACHINE LIFTING ASSEMBLY

FIELD OF THE INVENTION

Embodiments of the present invention are generally directed to work machines. More particularly, embodiments of the present invention are directed to compact work machines, such as compact track loaders and/or compact utility loaders, which can carry and operate a wide range of attachments while maintaining a reduced operating footprint.

BACKGROUND OF THE INVENTION

Many types of work machines are on the market today. An exemplary type of work machine is a loader, which is a machine commonly used as a hydraulic tool carrier configured to carry and operate a variety of hydraulically-driven attachments (e.g., implements or tools). Common attachments include augers, trenchers, grapples, etc. Other non-hydraulic attachments may also be carried and operated by loaders, such as buckets, rakes, etc.

Unfortunately, most currently-available loaders are manufactured in large sizes (e.g., having large widths and lengths), which can make the loaders difficult to maneuver and operate. Although there are many jobs that can be efficiently performed by loaders, such as the excavation of building foundations and basements, many residential and commercial real-estate properties have narrow entryways/exits onto the properties. As such, most currently-available loaders are too large to pass through the entryways/exits to access the properties. As a result, there is a need for a work machine, and particularly for a compact loader, having a small, reduced footprint (e.g., length and/or width), so as to provide for improved maneuverability and accessibility within confined spaces.

Furthermore, it would be beneficial to provide such a reduced-footprint work machine that includes improved features for efficiently moving the work machine on and off transport equipment, as well as placing the work machine in intended work locations. For example, it is often required that a crane or other lifting machine be used to lift the work machine on and off a trailer before or after transporting the work machine. In addition, once at the work site, it may be necessary to lift the work machine off the ground to position the work machine on a raised working area/platform (e.g., up on a raised berm) or down in a lowered working area platform (e.g., down in a pit). Previously-used work machines would generally require the use of multiple lifting points to facilitate the lifting of the work machines off the ground. And maintaining the balance of the work machine during such lifting operations could be problematic.

SUMMARY OF THE INVENTION

One aspect of the present invention concerns a work machine comprising a frame having laterally spaced sides and longitudinally spaced front and rear ends. The work machine additionally comprises at least one loader arm supported on the frame and shiftable relative to the frame between a raised position and a lowered position. The frame further comprises a pair of laterally spaced, longitudinally aligned lift eyes from which a full weight of the work machine can be suspended.

Another aspect of the present invention concerns a work machine having integral lifting points from which the full weight of the work machine can be supported when the work machine is lifted off the ground by a crane or other lifting machine. The work machine comprises a frame and a pair of or loader arms supported on the frame and shiftable relative to the frame between a raised position and a lowered position. The work machine further comprises a pair of reinforcing plates rigidly attached to the frame on opposite sides of the frame. Each of the reinforcement plates includes a loader arm attachment opening and a lifting opening. The loader arm attachment openings at least partially support the loader arms on the frame. The lifting openings are configured to support the full weight of the work machine when the work machine is lifted off the ground.

Another aspect of the present invention concerns a method of lifting a work machine. The method comprises a step of extending a first lifting hook through a first lift eye of the work machine. An additional step includes extending a second lifting hook through a second lift eye of the work machine. A further step includes lifting the work machine off the ground so that the work machine is suspended only by the first and second lifting hooks engaged with the first and second lift eyes.

BRIEF DESCRIPTION OF THE FIGURES

Embodiments of the present invention are described herein with reference to the following drawing figures, wherein.

Figure 1:
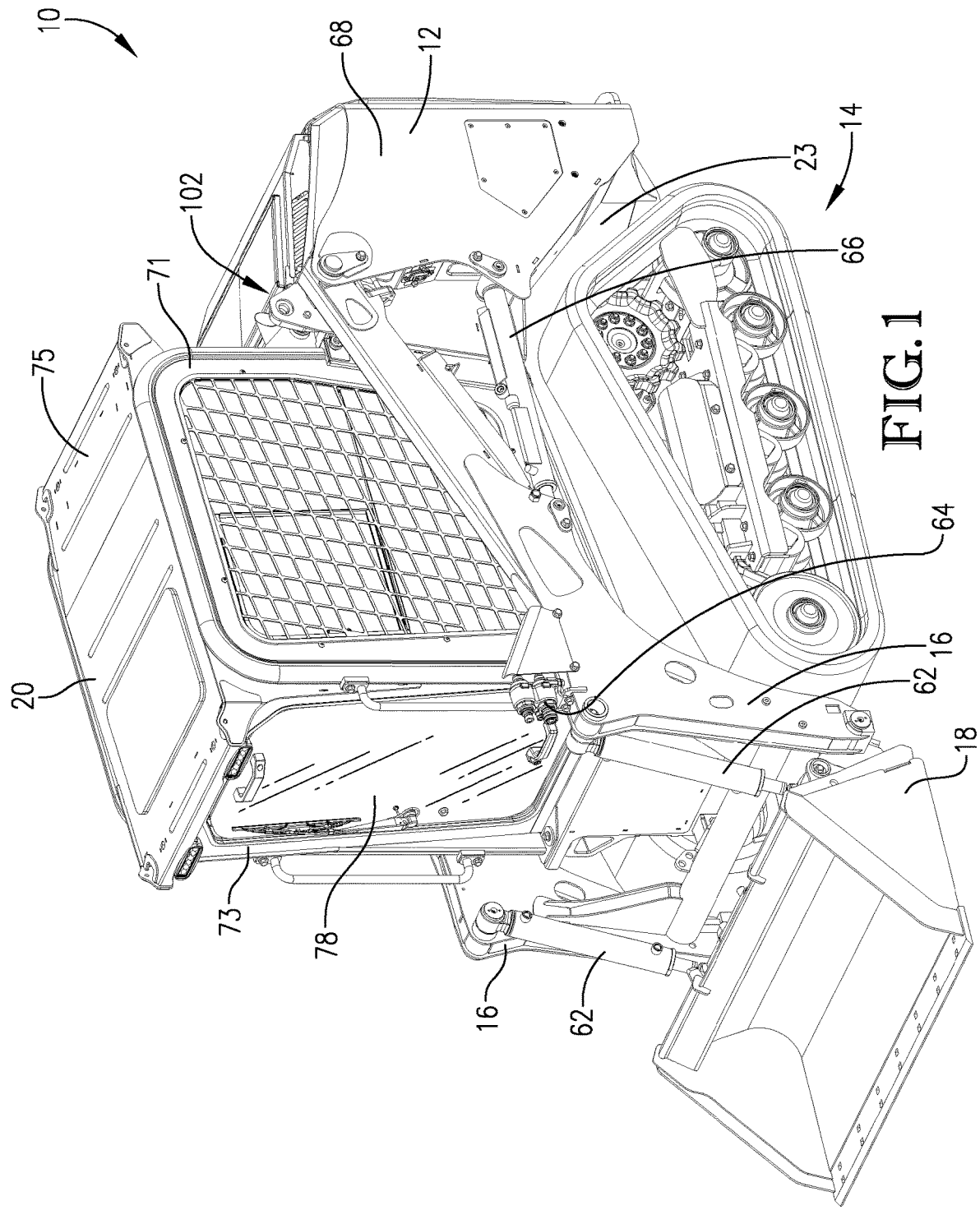
FIG. 1 is a front perspective view of a loader according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Overview

Figure 9:
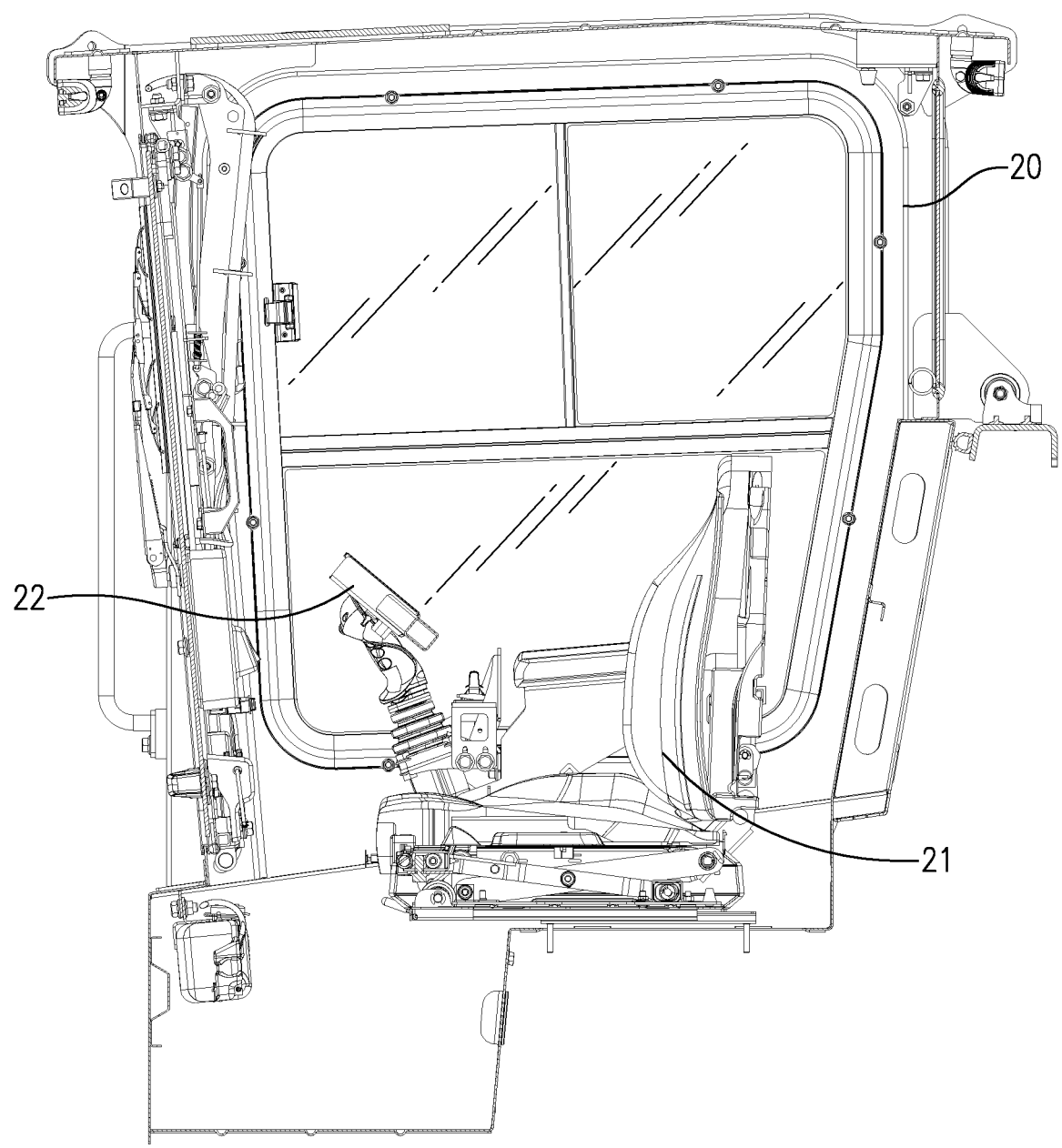
FIG. 9 is a side view of an interior space of a cab of the loader from FIGS. 1-8, with a portion of the cab removed to illustrate user controls of the loader.

Embodiments of the present invention are directed to a work machine, such as a loader 10, as illustrated in exemplary FIGS. 1-8. Broadly, the loader 10 may comprise a frame 12 supported on the ground by a drive assembly 14. As will be discussed in more detail below, in addition to supporting the loader 10 on the ground, the drive assembly 14 is configured to propel the loader 10 over the ground. The loader 10 may additionally comprise one or more, e.g., one loader arm or a pair of loader arms 16 supported by the frame 12 and configured to be raised and lowered. The loader arms 16 are further configured to support various types of attachments 18 for performing various types of work, as required by an operator of the loader 10. The loader 10 may include an operator cab 20 supported by the frame 12. The cab 20 may, as illustrated by FIG. 9, house a seat 21 and one or more user controls 22 (e.g., buttons, switches, levers, joysticks, touchscreen displays, etc.). The user controls 22 may be used by the operator to control various functions of the loader 10, as will be described in more detail below.

As used herein, directional terms are from the perspective of an operator sitting in the seat 21 of the loader 10 in an operating position (i.e., facing a front end of the loader 10). Thus, the terms "front", "forward", or "fore", mean a longitudinal direction towards the front end of the loader 10. It is noted that the attachment 18 is supported at the front end of the loader 10 by connections with front ends of the loader arms 16. The terms "back," "rear", "rearward", or "aft" mean a longitudinal direction towards the back end of the loader 10, i.e., behind the cab 20. The term "left" or "leftward" means a left lateral direction from the perspective of the operator sitting in the cab 20 and facing forward, and the terms "right" or "rightward" means a right lateral direction from the perspective of the operator sitting in the cab 20 and facing forward.

The loader 10 of embodiments of the present invention may comprise a "compact utility loader" or a "CUL," or may specifically comprise a "compact track loader" or "CTL." As used herein the term "loader" means is a self-propelled work machine comprising one or more loader arms configured to support various interchangeable, attachments that are operably connected with front ends of the loader arms. The attachments may be tools that have hydraulically-driven auxiliary functions, such as augers, grinders, tillers, rollers, trenchers, digger derrick, or the like. However, the loader 10 may support non-hydraulic attachments, such as buckets, blades, or the like. Regardless, because the inventive loader 10 of the present invention may be "compact," i.e., having a smaller size and weight than standard loaders, such compact loader may be much more maneuverable and provide more efficient load/weight distribution than standard loaders.

In more detail, in some embodiments, the loader 10 may have a front-to-back length (excluding the attachment 18) of between 60 and 100 inches, between 70 and 90 inches, or about 85 inches. The loader 10 may have a top-to-bottom height (as measured from a bottom of the drive assembly 14 tracks and a top of the cab 20) of between 50 and 100 inches, between 60 and 90 inches, between 70 and 80 inches, or about 85 inches. The loader 10 may have a lateral width (as measured between the outside lateral edges of the drive assembly 14 tracks) of between 36 and 56 inches, between 40 and 52 inches, or about 45 inches. The frame 12 of the loader 10 may have a lateral width (as measured between the outside lateral edges of the frame 12) of between 32 and 52 inches, between 36 and 48 inches, or about 41 inches. In some embodiments, the loader 10 will be configured with a ground clearance (as measured from the ground surface to a bottom side of the frame 12) of between 7 and 12 inches, between 8 and 10 inches, or about 9 inches. Given such dimensional characteristics, the loader 10 is configured with various enhanced features and functionalities (as described in more detail below), yet maintains an overall small footprint so as to increase maneuverability and to enhance accessibility of the loader to confined working areas/spaces.

Beginning with the frame 12 of the loader 10, the frame 12 may broadly form a housing that defines an interior compartment within which various components of the loader 10 (e.g., engine, hydraulic system, etc.) are housed and supported, as will be discussed in more detail below. The frame 12 may comprise a left side 23 (See FIG. 1) and a right side 24 (See FIG. 2), which are spaced apart and separated by/connected together via a bottom side 26 (See FIG. 2). The left side 23 and the right side 24 may each be configured as a sidewall, and the bottom side 26 may be configured as a bottom wall. As such, the frame 12 can present the interior compartment for supporting various components of the loader 10, as will be discussed in more detail below.

Figure 10:
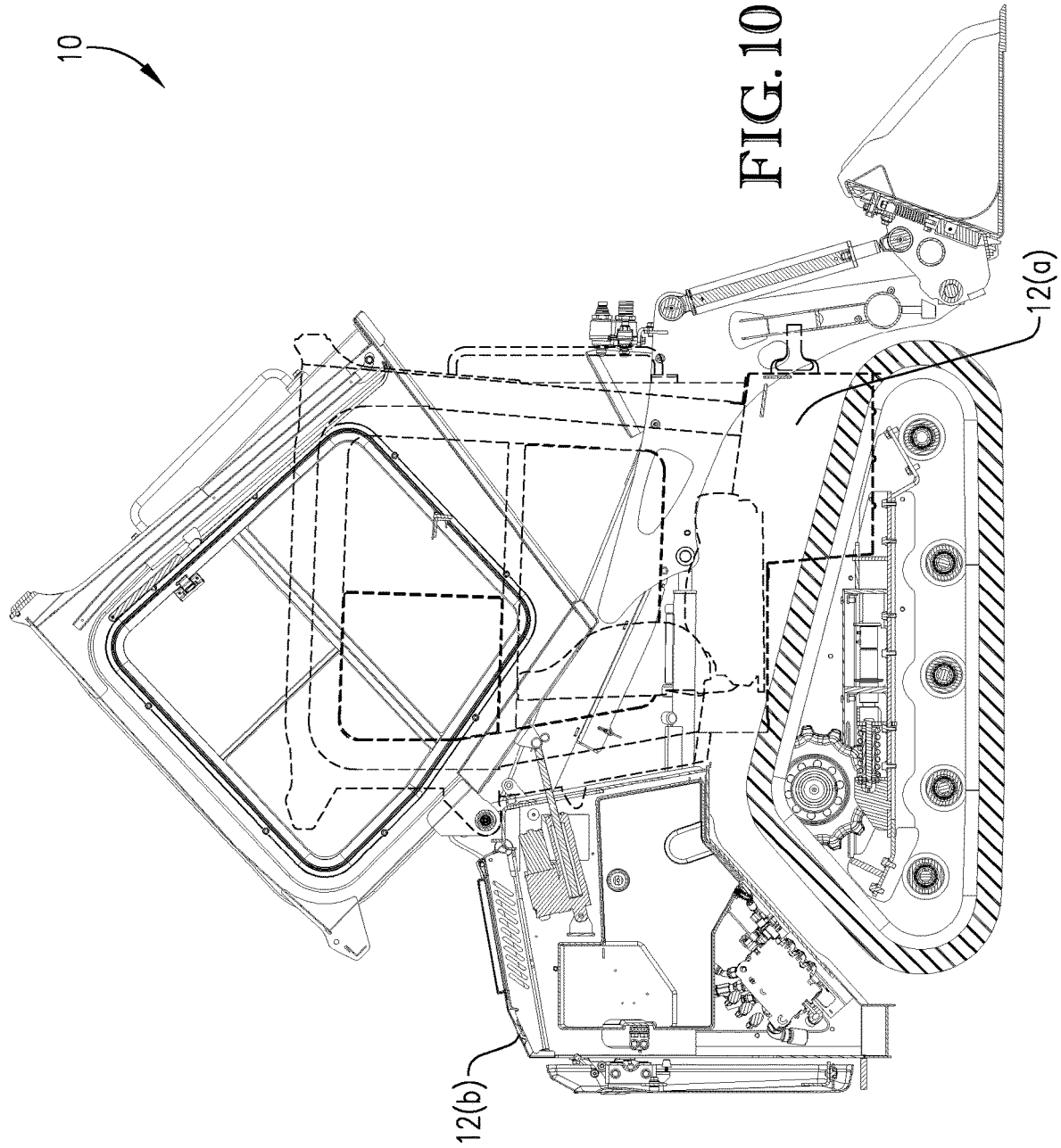
FIG. 10 is a side elevation view of the loader from FIGS. 1-8, with a cab of the loader shown positioned in both a raised position (solid line) and a lowered position (in broken line)
Figure 11:
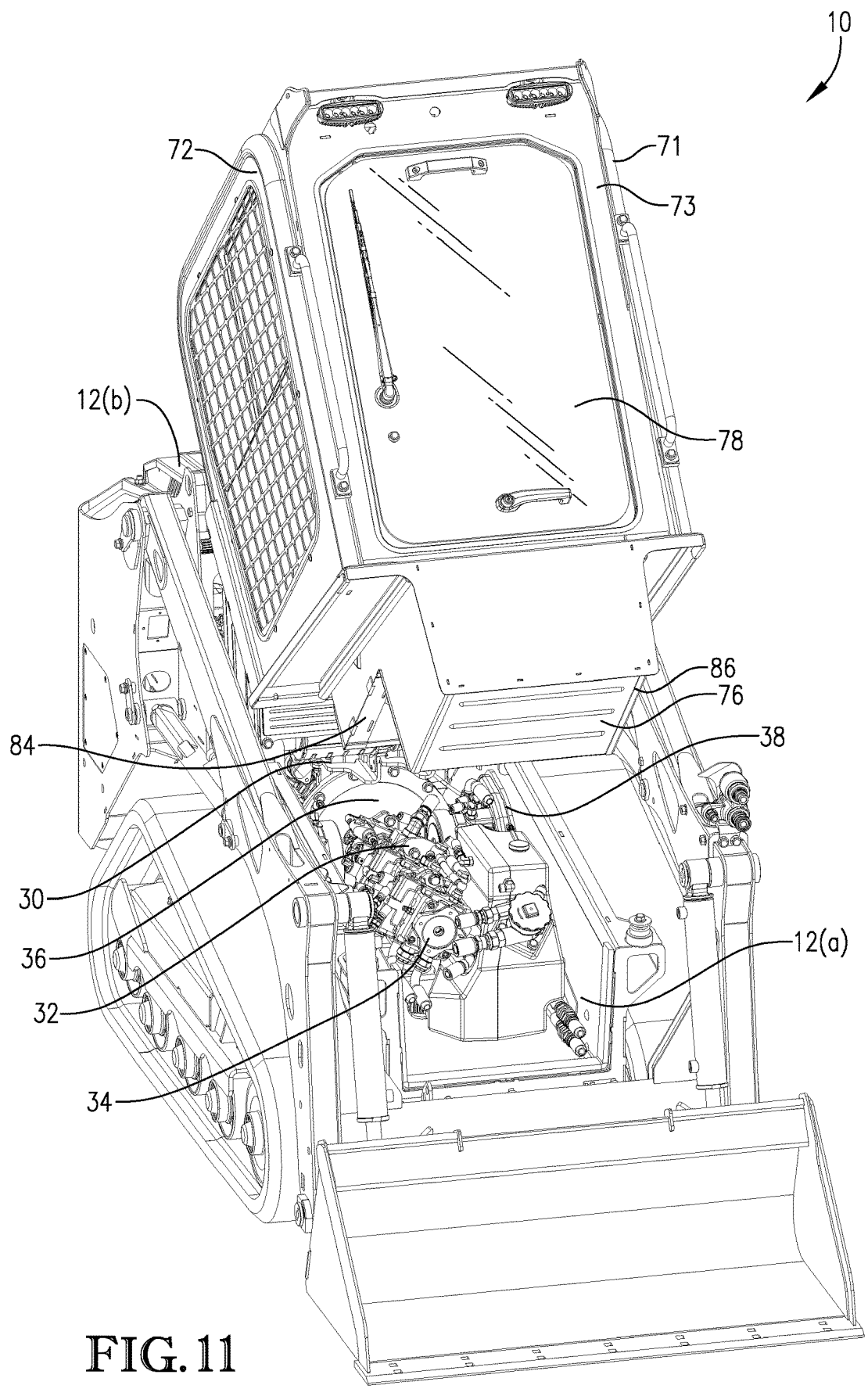
FIG. 11 is a front perspective view of the loader from FIGS. 1-8, with a cab of the loader shown in a raised position.

Furthermore, and with reference to FIGS. 10 and 11, as the frame 12 may comprise a forward portion 12(*a*) and a rearward portion 12(*b*). As such, the frame 12 may extend longitudinally from a rearward end (part of the rearward portion 12(*b*)) to a forward end (part of the forward portion 12(*a*)). In general, the forward portion 12(*a*) of the frame 12 may have a height that is less than height of the rearward portion 12(*b*). In some embodiments, the cab 20 may be hingedly connected to a top of the frame 12, such that the cab 20 can be selectively positioned in a closed, operating position (See, e.g., FIG. 22) and an open, raised position (See, e.g., FIGS. 10 and 11). Specifically, as shown in FIG. 10, a back side of the cab 20 may be hingedly connected to a top of the frame 12, near or at a front of the rearward portion 12(*b*) of the frame 12. The hinge connection may be a lateral extending, horizontal connection, such that the cab 20 can be vertically raised and lowered. When in the closed, operating position, a front, lower portion of the cab 20 may be securely coupled, e.g., via threaded fasteners, latches, or other locking mechanisms, to securely hold the cab 20 in place (with respect to the frame 12) in the closed, operating position. Further, the loader 10 may include an access door 28 hingedly connected to the frame 12 at the back end of the loader 10, and configured to be selectively positioned in a closed position (See, e.g., FIGS. 2 and 6) and an open position (See, e.g., FIG. 12). Specifically, in some embodiments, a right side of the access door 28 may be hingedly connected to a back end of the right side 24 of the frame 20. The hinge connection may be a vertical connection, such that the access door 28 can be opened and closed about a vertical axis. A left side of the access door 28 may include a locking mechanism (e.g., a latch) that permits the access door 28 to be selectively coupled with the left side 23 of the frame 12, so as to maintain the access door 28 in the closed position.

In view of the above, the frame 12, in addition to the cab 20 and the access door 28, are configured to present (and selectively enclose) the interior compartment within which various components of the loader 10. Specifically, with the cab 20 and the access door 28 in the closed position, various components of the loader 10 are enclosed within the interior compartment. Furthermore, however, with the cab 20 and/or the access door 28 in the open position, certain of those various components within the interior compartment may be accessed for maintenance, repair, or the like. For example, and with reference to FIG. 11, the interior compartment of the frame 12 may house a power unit, such as a combustion engine 30 of the loader 10, at least a portion of which may be positioned within a rearward portion 12(*b*) of the frame 12. It is noted that in some embodiments, the loader 10 may include a power unit in the form of an electric motor to power the loader 10, in place of (or in addition to) the combustion engine 30.

The interior compartment may additionally house one or more components of a hydraulic system that is used to power one or more hydraulically-powered components of the loader 10. The hydraulic system may comprise a hydraulic auxiliary pump 32 that may be operably connected to a front end of the engine 30, as well as a hydrostatic transmission 34 that may be operably connected to a front end of the auxiliary pump 32. As such, the engine 30 may provide rotary power to each of the auxiliary pump 32 and the hydrostatic transmission 34. As will be described in more detail below, the hydraulic system, and particularly the hydraulic pump 32, may provide hydraulic power to the loader arms 16 and to the attachments 18 of the loader 10, as necessary. The hydraulic system, and particularly the hydrostatic transmission 34, may provide hydraulic power to the drive assembly 14, as discussed in more detail below. In some embodiments, a flywheel 36 may be positioned between the engine 30 and the auxiliary pump 32 and the hydrostatic transmission 34. Such flywheel 36 may be used to maintain a consistent power output from the engine 30 during varying RPMs.

In certain embodiments, the loader 10 may include a pair of drive motors 38 positioned within the interior compartment of the frame 12, on either side of the auxiliary pump 32 (i.e., a left side drive motor 38 and a right side drive motor 38). Such drive motors 38 may be used to provide power to the drive assembly 14. Specifically, the hydrostatic transmission 34 may be configured to provide hydraulic power to the drive motors 38, which in turn provide rotary power to the drive assembly 14 (e.g., tracks or wheels) of the loader 10. In some embodiments, the loader 10 may be in the form of a compact track loader, such that the drive assembly 14 comprises a pair of tracks, as described in more detail below. However, the loader 10 may, alternatively, be propelled by one or more wheels in place of, or in addition to, tracks. Regardless, as discussed above, the interior compartment of the frame 12, may house the engine 30, the auxiliary pump 32, the hydrostatic transmission 34, the flywheel 36, and the drive motors 38, as well as various other components of the loader's 10 hydraulic system (e.g., one or more hydraulic fluid reservoir tank(s) (e.g., a plurality of hydraulic fluid reservoir tanks), filters, ride control valve, accumulator, brake valve, lines/conduits, etc.). In some embodiments, the engine 30 may be positioned within the rearward portion 12(*b*) of the frame 12, while the auxiliary pump 32, the hydrostatic transmission 34, the flywheel 36, and the drive motors 38, as well as various other components of the loader's 10 hydraulic system may be positioned within the forward portion 12(*a*) of the frame 12. Regardless, as described in more detail below, certain components of the loader's 10 hydraulic system may be positioned within the rearward portion 12(*b*) of the frame 12.

Figure 12:
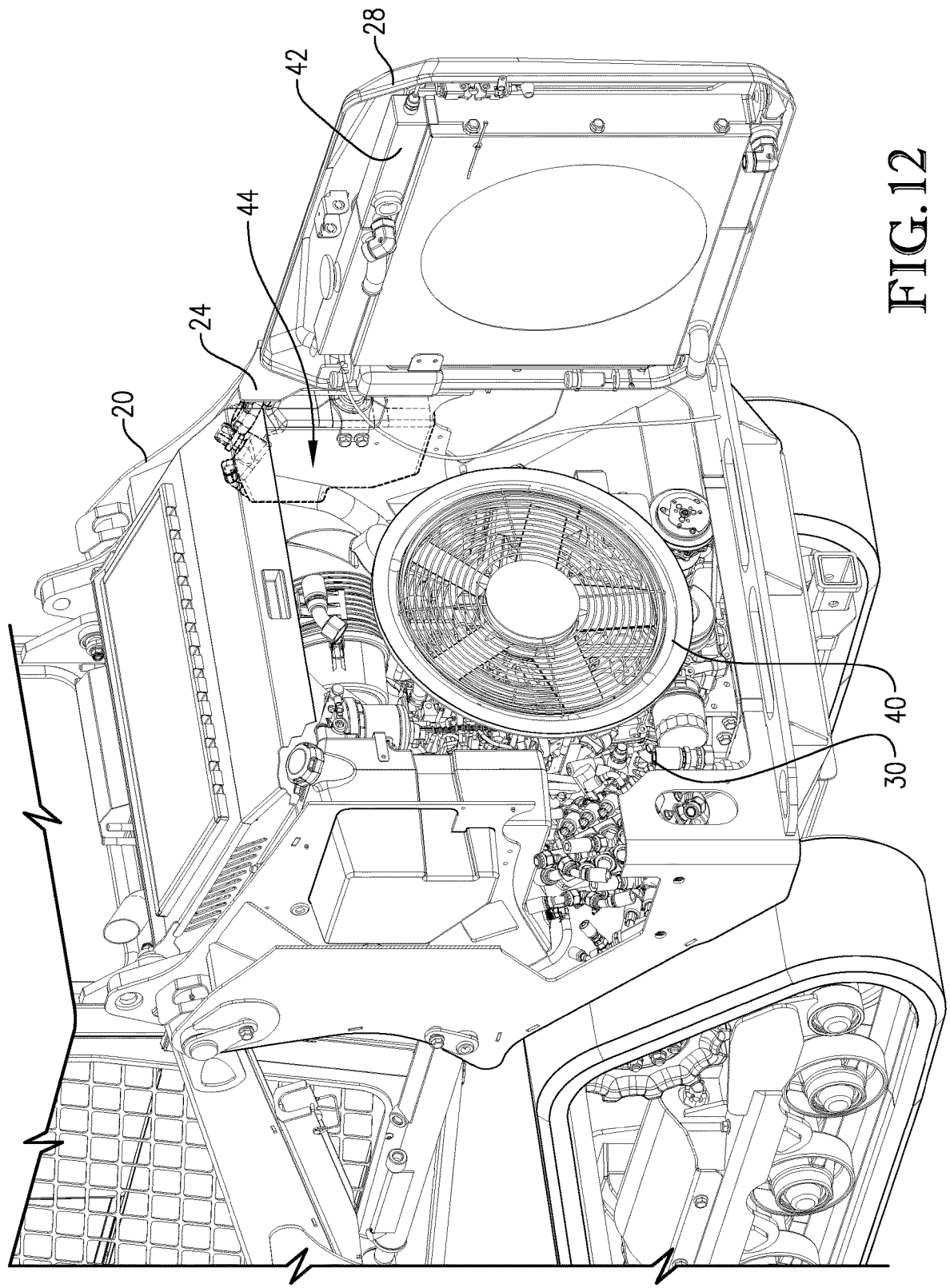
FIG. 12 is a rear perspective view of the loader from FIGS. 1-8, with a rear access door of the loader illustrated in an open position.
Figure 13:
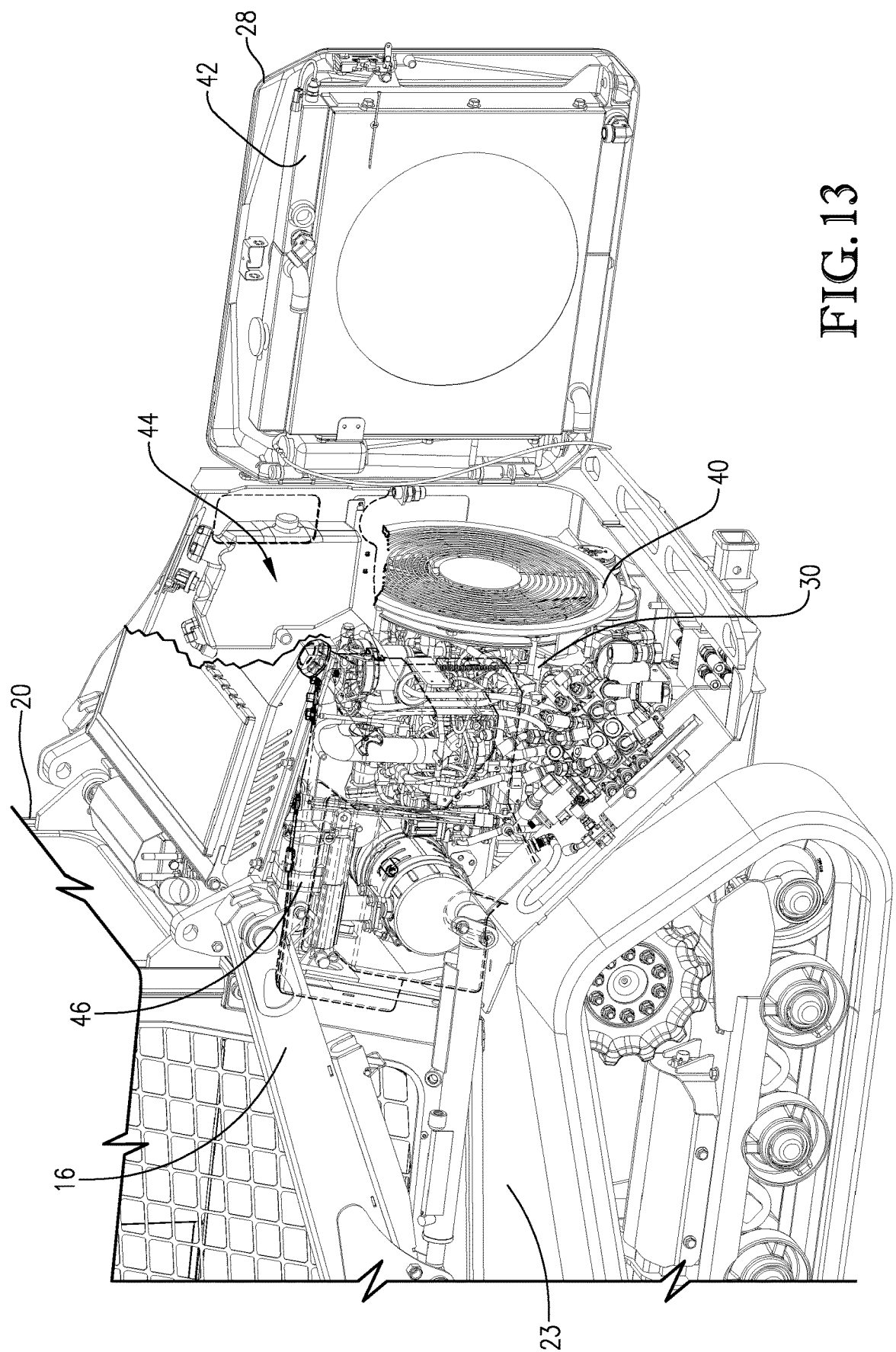
FIG. 13 is another rear perspective view of the loader from FIGS. 1-8, with a portion of a frame of the loader cut away to illustrate internal components of the loader.

Turning to the rearward portion 12(*b*) of the frame 12 in more detail, as illustrated in FIGS. 12 and 13, various components of the loader 10 may be positioned within the internal compartment presented by the rearward portion 12(*b*). For instance, as noted previously, the engine 30 (or at least a portion thereof) may be positioned within the rearward portion 12(*b*) of the frame 12. A cooling system may be positioned rearward of the engine 30. In particular, the cooling system may comprise a fan 40 attached to a rear side of the engine 30. The cooling system may additionally comprise a radiator 42 positioned rearward of the fan 40. In some embodiments, as will be described in more detail below, the radiator 42 may be attached to the access door 28 and configured to rotate open and closed (with respect to the fan 40) in conjunction with the access door 28. In addition, the rearward portion 12(b) of the frame 12 may house a heating, ventilation, and air-conditioning ("HVAC") system 44, which is configured to provide temperature controlled airflow to the cab 20, as will be discussed in more detail below. Furthermore, the rearward portion 12(b) of the frame 12 may house an actuator 46, as shown in FIG. 13, in operable engagement with the cab 20 and configured to selectively shift the cab 20 between open and closed positions, as noted above and as will be discussed in more detail below. The actuator may comprise an electro-hydraulic actuator, as well as various other types linear actuators. Finally, the rearward portion 12(b) of the frame 12 may house various other components of the loader, such as components of the loader's 10 electrical system (e.g., battery, engine 30 starter, alternator), fuel tank, associated cables/lines, etc.

Notably, the cab 20 and the access door 28 being configured to selectively open and close provide access to the interior compartment of the frame 12. For example, the cab 20 can be raised to the open position to provide access to the engine 30, the auxiliary pump 32, the hydrostatic transmission 34, the flywheel 36, the drive motors and/or various other components of the loader's 10 hydraulic system. The access door 28 can be opened to provide access to the engine 30, the cooling system (e.g., the fan 40 and radiator 42), the HVAC system 44, electrical system, and/or other related components. Such access can facilitate efficient service and maintenance of the loader 10.

Figure 4:
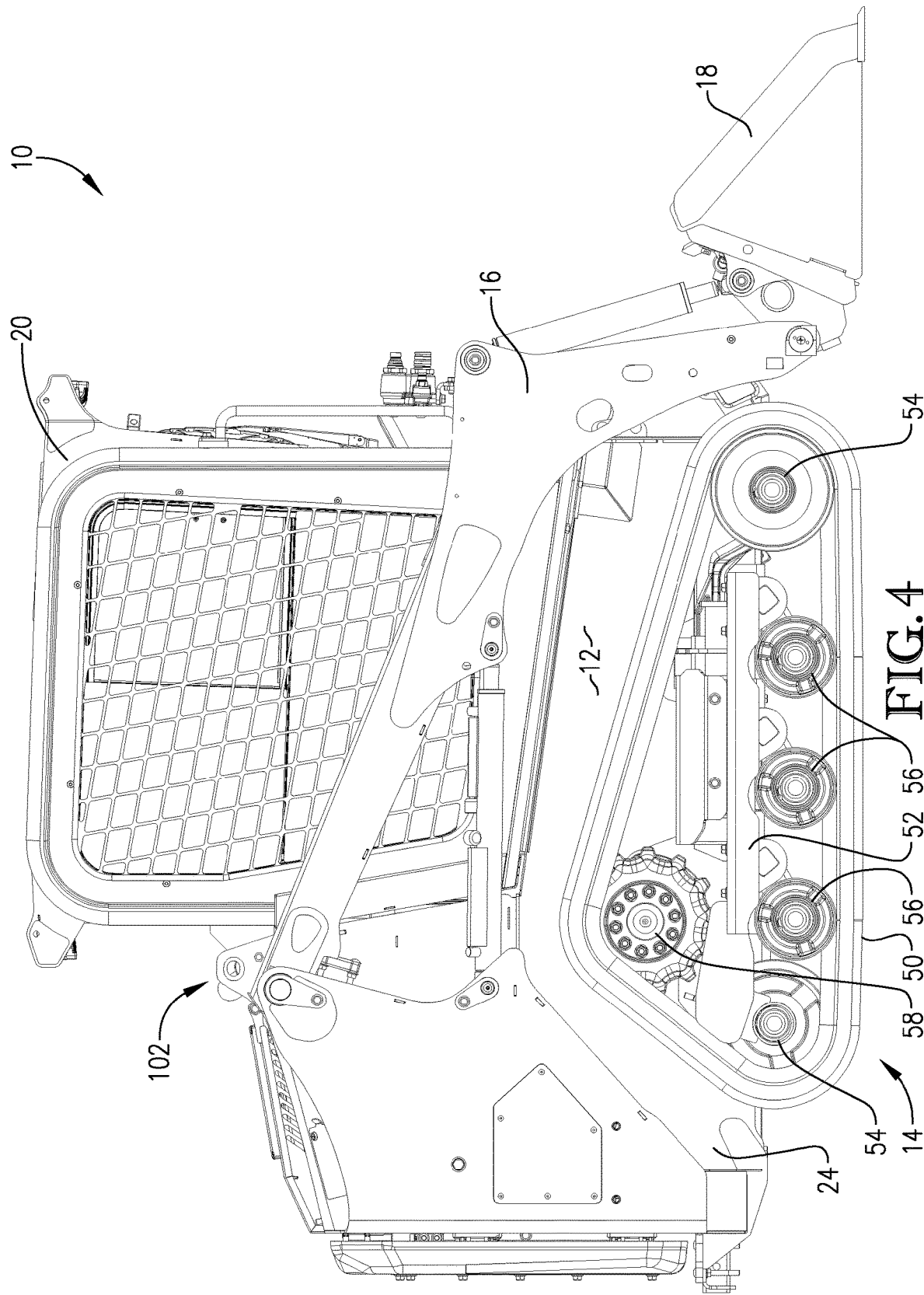
FIG. 4 is a right side elevation view of the loader from FIGS. 1-3
Figure 5:
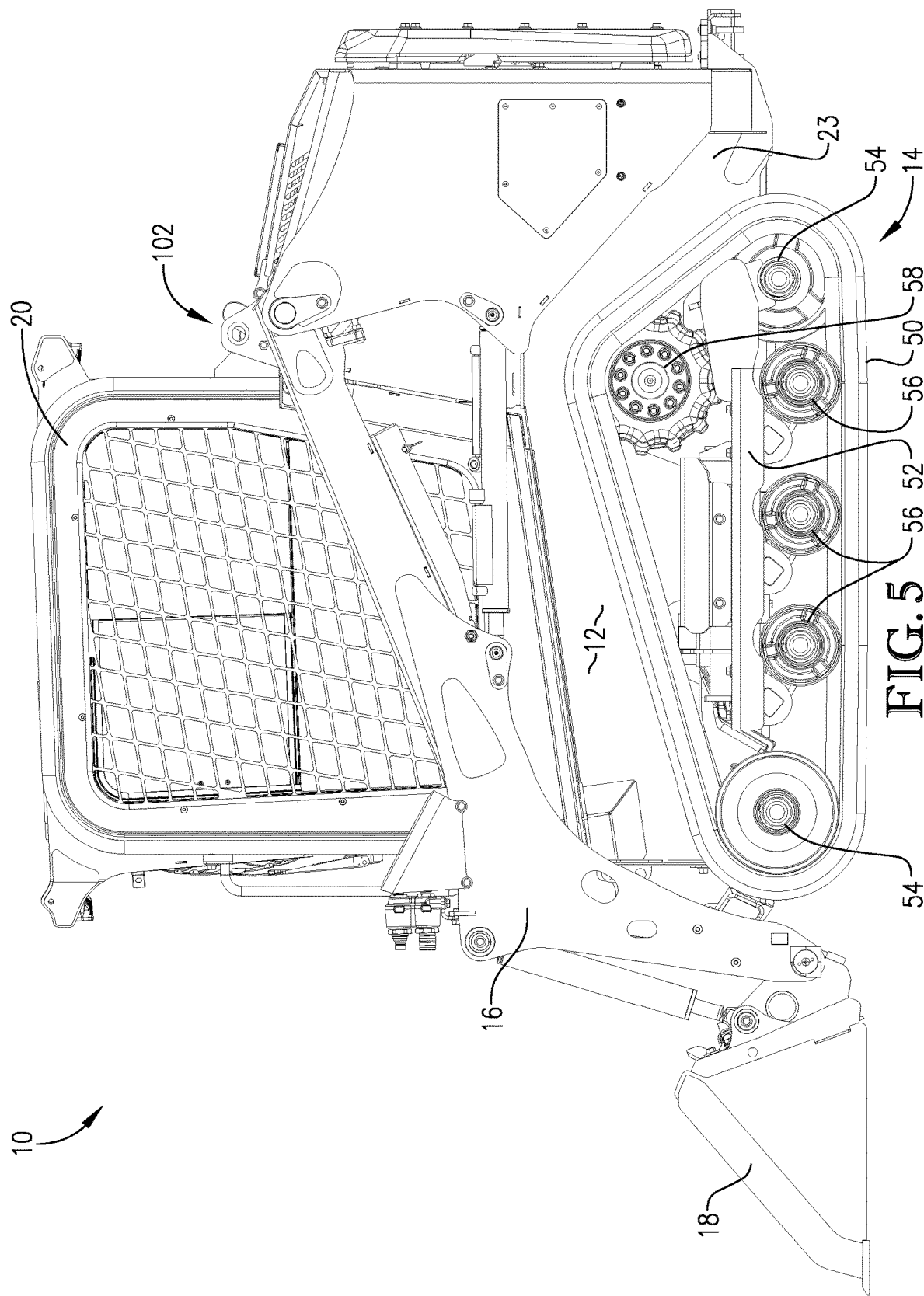
FIG. 5 is a left side elevation view of the loader from FIGS. 1-4
Figure 6:
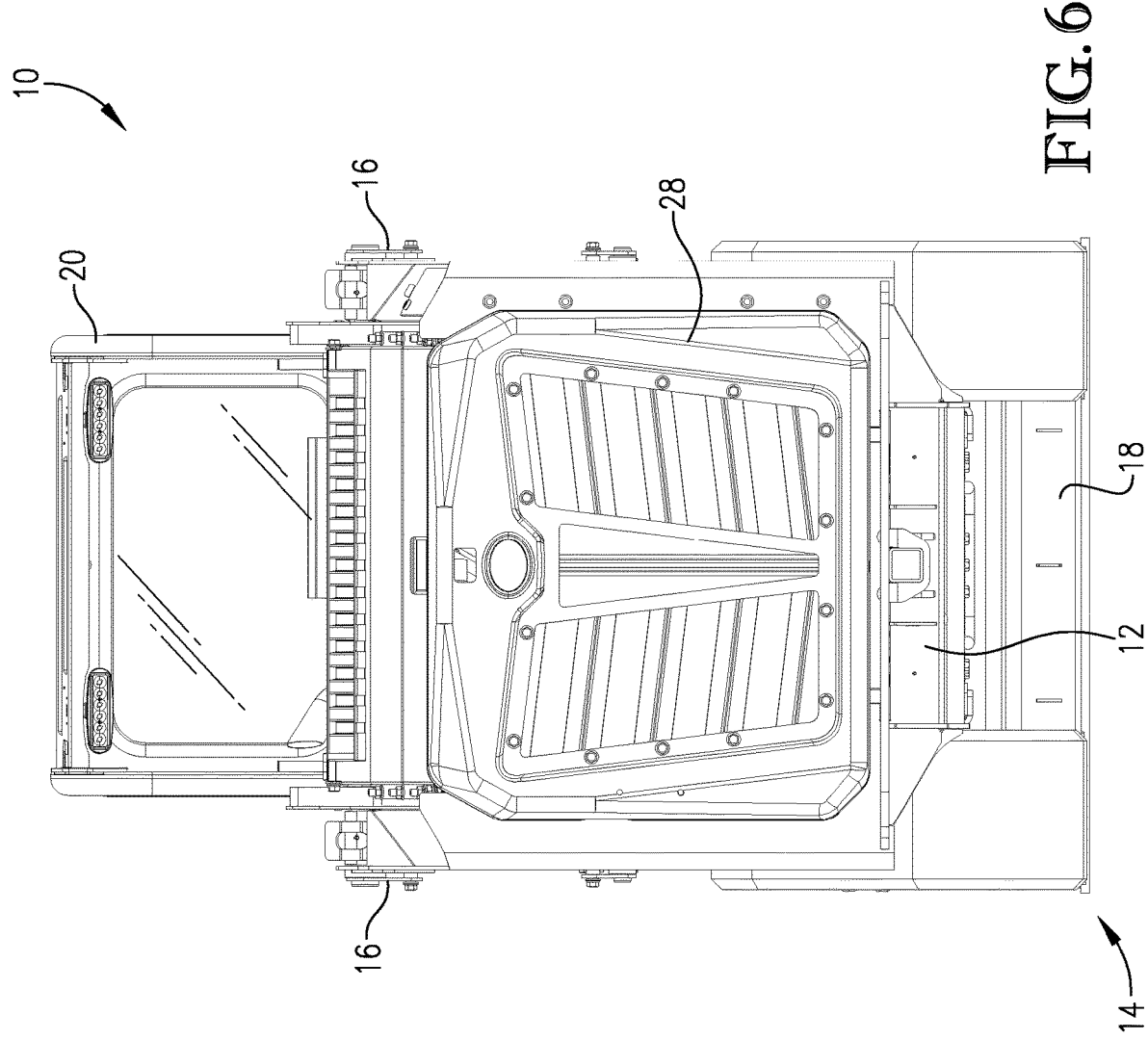
FIG. 6 is a rear elevation view of the loader from FIGS. 1-5.
Figure 7:
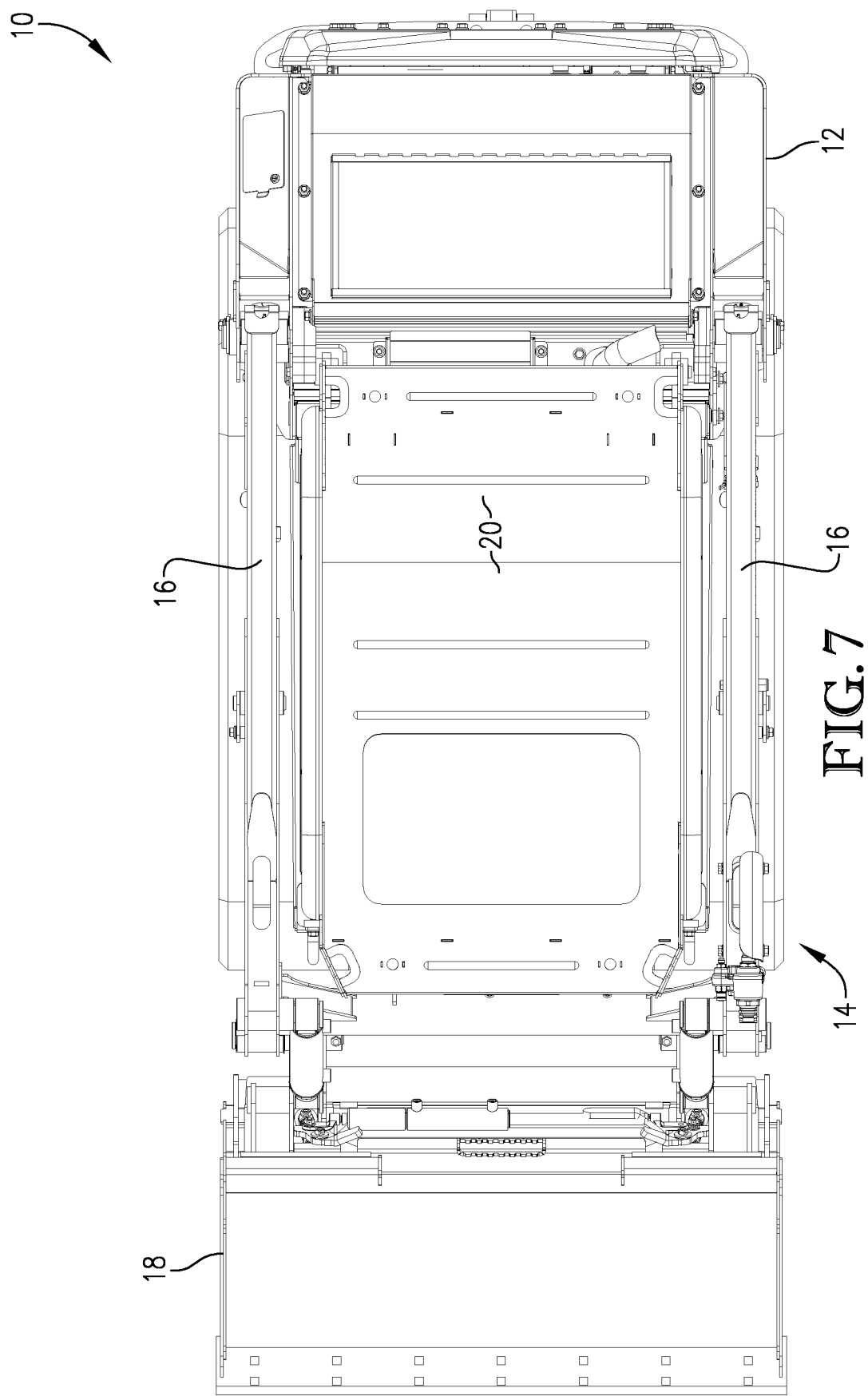
FIG. 7 is a top plan view of the loader from FIGS. 1-6.
Figure 8:
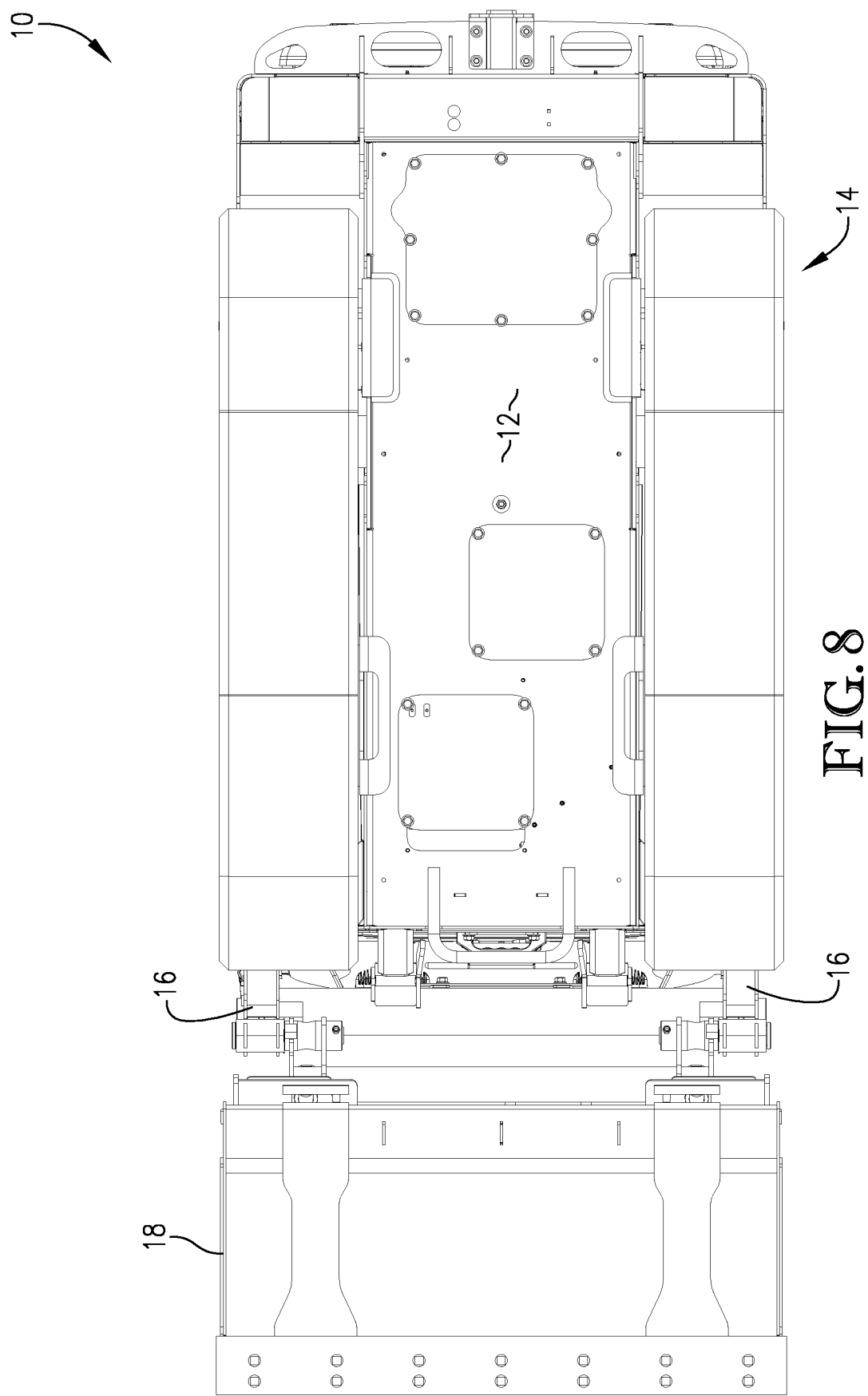
FIG. 8 is a bottom plan view of the loader from FIGS. 1-7.

With reference to FIGS. 4 and 5, the drive assembly 14 of the loader may comprise a pair of endless tracks 50 that extend from the exteriors of the left side 23 and the right side 24 of the frame 12. In more detail, the drive assembly 14 may comprise a pair of track frames 52, with each track frame 52 being rigidly secured to one exterior side 23, 24 of the frame 12 of the loader 10. Specifically, the left side track frame 52 may be rigidly secured (e.g., via welding) to the left side 23 of the frame 12, so as to extend laterally away from the frame 12. Similarly, the right side track frame 52 may be rigidly secured (e.g., via welding) to the right side 24 of the frame 12, so as to extend laterally away from the frame 12. As shown in FIGS. 4 and 5, the track frames 52 may support one or more wheels rotatably secured thereto, so as to permit the tracks 50 to rotate around the track frames 52. Specifically, each track frame 52 may support a pair of idler wheels 54, with a front idler wheel 54 secured to a front of the track frame 52 and a rear idler wheel 54 secured to a rear of the track frame 52. In addition, each track frame 52 may support a plurality of roller wheels 56 (e.g., three roller wheels) secured to the track frame 52 between the idler wheels 54 in a front-to-back direction. Each of the roller wheels 56 be secured to a bottom of the track frame 52 via an independent suspension element so as to provide enhanced stability and driveability of the loader 10. In contrast, the idler wheels 54 may be directly secured to the track frames 52 via an axle.

One of the tracks 50 may loop around each of the track frames 52 and associated wheels (e.g., idler wheels 54 and roller wheels 56) so as to present a left track 50 and a right track 50. The tracks 50 may be formed from rubber, metal, or combinations thereof. Although the loader 10 is illustrated as having tracks 50, in some embodiments, the loader 10 may include one or more wheels on each side 23, 24 of the frame 12 to support and to propel the loader 10.

To facilitate rotation of the tracks 52, the drive assembly 14 may additionally comprise a pair of drive sprockets 58 positioned on either exterior side 23, 24 of the frame 12, as shown in FIGS. 4 and 5. Specifically, in some embodiments, a left side drive sprocket 58 may extend from the left side 23 of the frame 12 at a position above the left side track frame 52. Similarly, a right side drive sprocket 58 may extend from the right side 24 of the frame 12 at a position above the right side track frame 52. Each of the tracks 50 may be looped around the associated track frame 52, wheels (e.g., idler wheels 54 and roller wheels 56), and drive sprocket 58. As such, the tracks 50 may be configured in a triangular shape, when viewed from the sides of the loader 10. An interior surface of the tracks 50 may be formed with nubs that engage with teeth of the drive sprockets 58, such that rotation of the drive sprockets 58 will cause a corresponding rotation of the tracks 50. As such, the loader 10 can be propelled by rotating the drive sprockets 58, which causes rotation of the tracks 50. Specifically, the left side drive sprocket 58 may be operably connected with the left side drive motor 38, and the right side drive sprocket 58 may be operably connected with the right side drive motor 38, such that the drive motors 38 can drive the drive sprockets 58. As a result, the loader 10 can be propelled forward, rearward, and turn leftward/rightward.

Turning to the loader arms 16 of the loader 10, the loader arms 16 may comprise two loader arms 16 in the form of a left loader arm (i.e., positioned on a left side of the loader 10) and a right loader arm (i.e., positioned on a right side of the loader 10). Each of the loader arms 16 may have a rear end that is pivotably coupled with the frame 12 of the loader 10, near the back end of the loader 10. Each of the loader arms 16 may extend forward to a front end that supports a hitch assembly 60, as perhaps best shown in FIG. 2. Such hitch assembly 60 may extend at least partially between the left and right loader arms and may generally comprise one or more connection plates configurable to releasably secure various types of attachments 18 to the loader arms 16. The loader arms 16 may additionally include a cross-bar, as perhaps best shown in FIG. 1, that extends between the left and right loader arms 16. In certain embodiments, the cross-bar may be positioned adjacent to and behind the hitch assembly 60. Furthermore, in some embodiments, each of the loader arms 16 may include a tilt actuator 62, as shown in FIG. 1, that extends from the loader arm 16 to one of the lateral sides of the hitch assembly 60, so as to permit tilting of the hitch assembly 60 and any attachment 18 coupled with the hitch assembly 60. The tilt actuators 62 may comprise hydraulic cylinders (e.g., single or double-acting cylinders), pneumatic cylinders, and/or electric linear actuators. For example, if an attachment 18 in the form of a bucket is attached to the hitch assembly 60, actuation of the tilt actuators 62 will permit the bucket to be tilted such as for selectively collecting and dumping material. Finally, one or more of the loader arms 16 may include a hydraulic coupler 64, as shown in FIG. 1, with which one or more hydraulic lines may be coupled to provide hydraulic power to attachments 18 that operate on hydraulic power.

The loader arms 16 may be raised and lowered via lift actuators 66. In some embodiments, the lift actuators 66 may comprise linear actuators, such as hydraulic cylinders (e.g., single or double-acting cylinders), pneumatic cylinders, and/or or electric linear actuators. In more detail, each loader arm 16 may be associated with a lift actuator 66 that is pivotably coupled at a rearward end with one lateral side the frame 12. Each lift actuator 66 extends generally forward to a respective loader arm 16, such that a forward end of the lift actuator 66 is pivotably coupled with the loader arm 16 at a position between the rearward and forward end of the loader arm 16. In some embodiments, the frame 12 may include a cover panel 68 one each lateral side of the loader 10 that is spaced apart from the left side 23 and right side 24 of the frame 12. In certain embodiments, the cover panels 68 may cover rearward portions of the loader arms 16 and the lift actuators 66, so as to cover the connections between the loader arms 16 and the lift actuators 66 to the frame 12. In some embodiments, connection between the loader arms 16 and the lift actuators 66 to the frame 12 may also include a connection with the cover panels 68. Specifically, the rearward ends of the loader arms 16 and the lift actuators 66 may be positioned between the respective left or right sides 23, 24 of the frame 12 and the respective cover panels 68 of the frame, such that the rearward ends of the loader arms 16 and the lift actuators 66 are simultaneously rotatably coupled with both the left or right sides 23, 24 and the respective cover panels 68.

Because the rear ends of the loader arms 16 are rotatably coupled with the frame 12 at a fixed pivot point, the loader arms are configured in a "pivot-lift configuration" (also commonly referred to as a "radial lift configuration). In such a configuration, the forward ends of the loader arms 16, and any attachment 18 coupled therewith, will generally travel in an arc-like or circular travel path. In some other embodiments (not shown in the drawings), the loader arms 16 may be configured in a "vertical-lift configuration." In such a configuration, the entirety of the loader arms 16 shift position upward, downward, forward, and/or rearward with respect to the frame 12 of the loader 10 as the loader arms 16 transition between lowered and raised positions. As such, the forward ends of vertical-lift configured loader arms 16, and any attachment 18 coupled therewith, can travel along a substantially vertical travel path.

Figure 2:
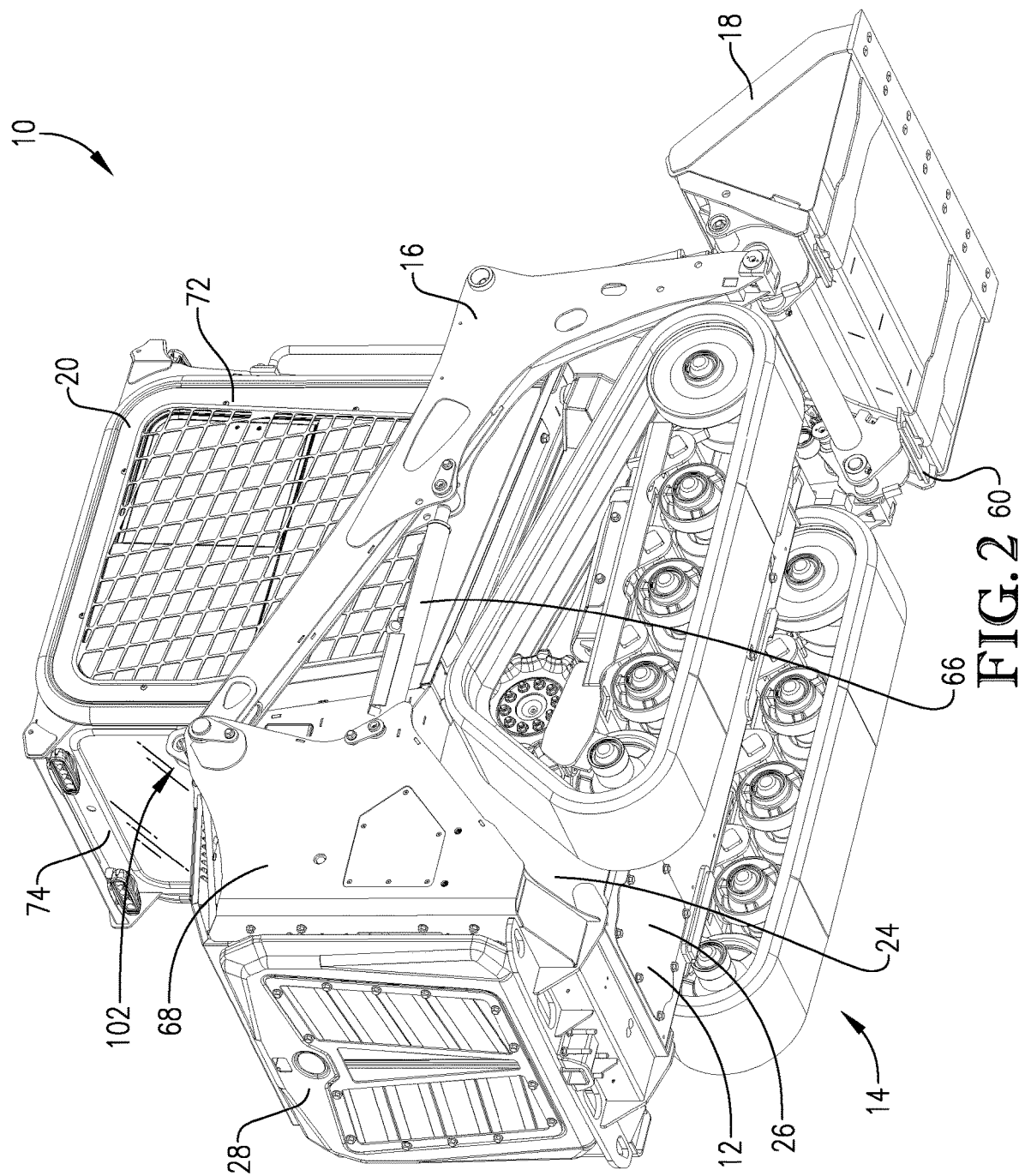
FIG. 2 is a rear perspective view of the loader from FIG. 1.
Figure 3:
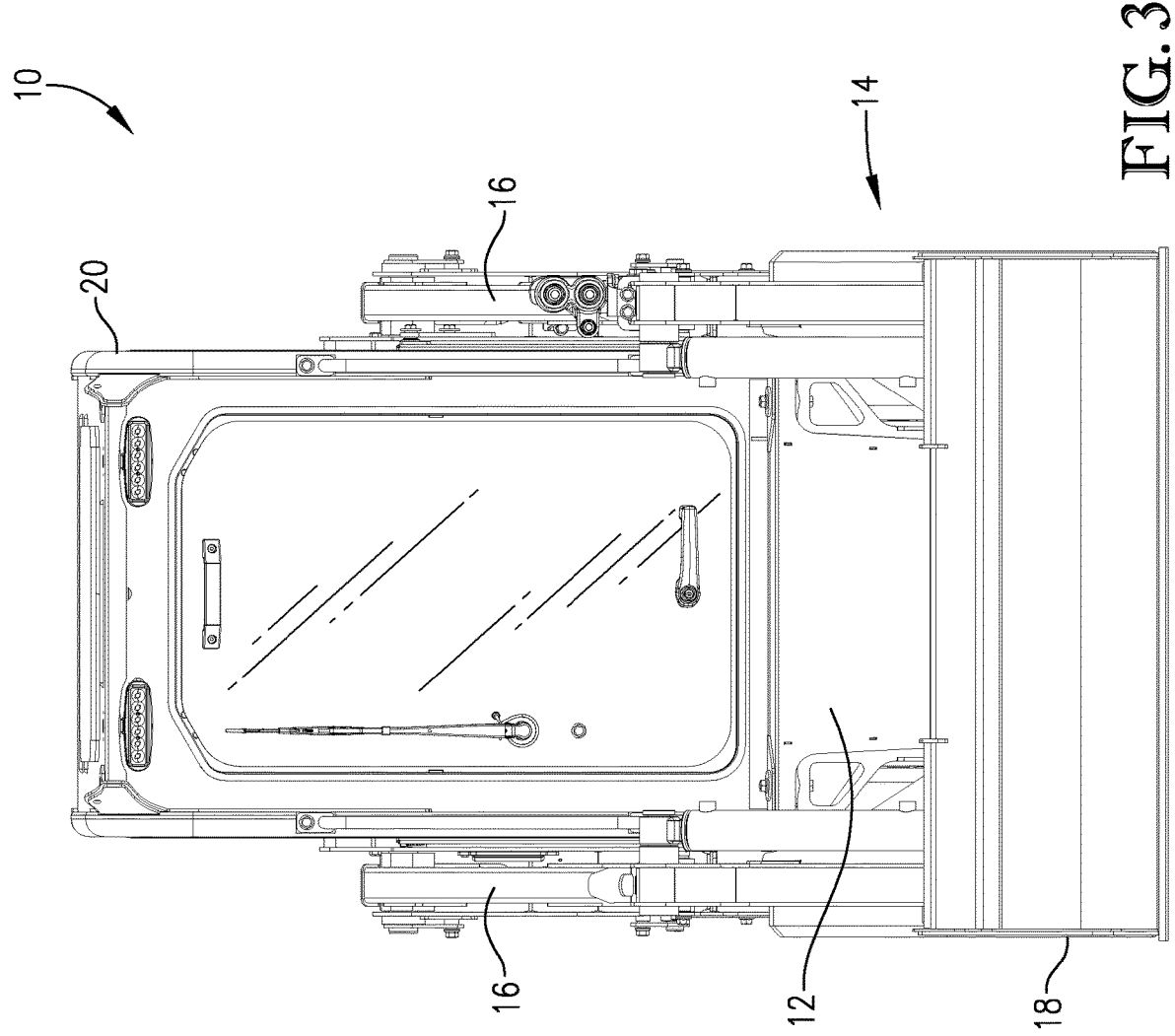
FIG. 3 is a front elevation view of the loader from FIGS. 1 and 2.

As noted previously, the cab 20 of the loader 10 may be rotatably coupled with the frame 12, as illustrated in FIG. 10, such that the cab 20 can be selectively positioned in a closed, operating position and in an open, raised position. The cab 20 may, as shown in FIGS. 1, 2, and/or 11, have a generally rectangular shape with a left side 71, a right side 72, a front side 73, a back side 74, a top side 75, and a bottom side 76. The sides 71-76 of the cab 20 may enclose an interior space within which an operator can be positioned to operate the loader, as will be disclosed in more detail below. Each of the left side 71, the right side 72, and the back side 74 may comprise a frame bordering a transparent material (e.g., plastic or glass) configured to operate as a window, such that an operator of the loader 10 can view the eternal environment. In certain embodiments, the back side 74 may comprise a lower portion and an upper portion. The upper portion may comprise the transparent material, while the lower portion may comprise a generally solid, sheet of material (e.g., steel). However, the lower portion may include one or more openings or ports configured to facilitate airflow into and out of the cab 20 from the HVAC system 44. In some embodiments, the top side 75 may also include one or more windows so as to permit light to enter the interior space of the cab 20.

Figure 14A:
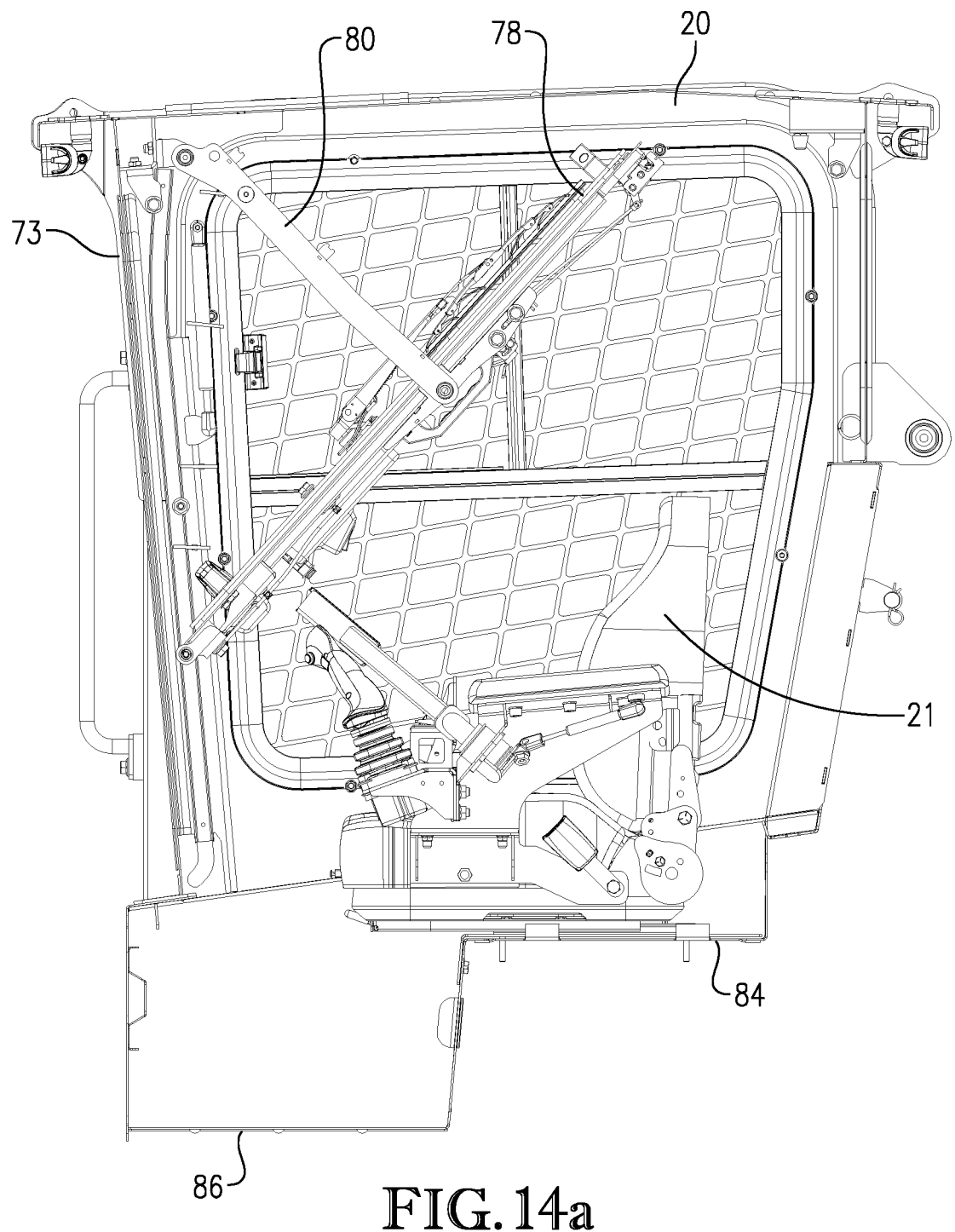
FIG. 14a is a left side elevation view of an interior space of a cab of the loader from FIGS. 1-8, with a portion of the cab removed to illustrate a main door in an intermediate position between a closed position and an opened position.
Figure 14B:
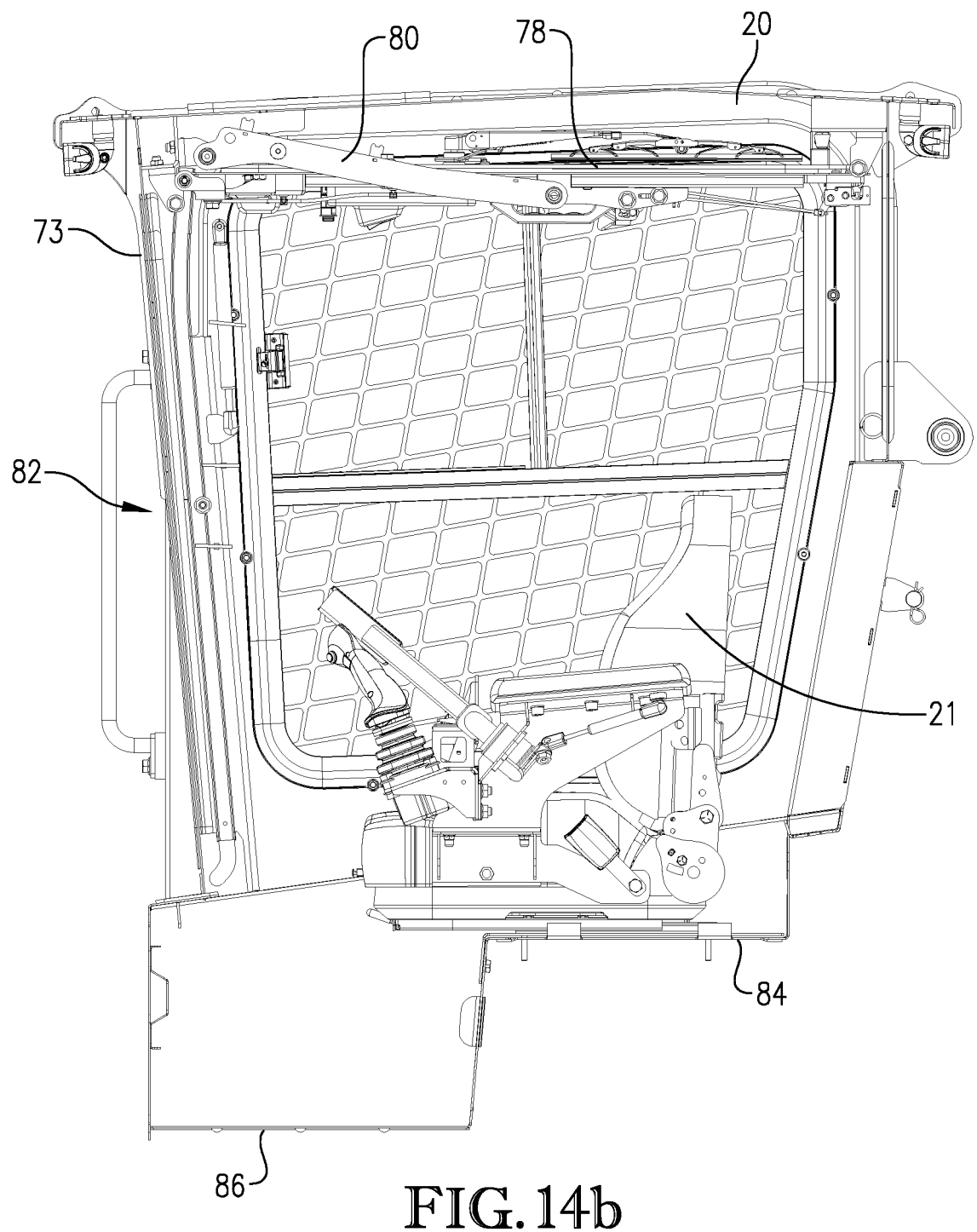
FIG. 14b is a left side elevation view of the interior space of the cab from FIG. 14b, with the main door the opened position.

The front side 73 of the cab 20 may comprise a frame that borders a main door 78. As shown in FIGS. 14a and 14b, the main door 78 may be attached to other components of the cab 20 via an actuation assembly 80 configured to permit the main door 78 to selectively transition back and forth between an opened position (e.g., FIG. 14b) and a closed position (e.g., FIG. 1). It is noted that FIG. 14a illustrates the main door in a transition state between the opened position and the closed position. The main door 78 may comprise a transparent material (e.g., plastic or glass) configured to operate as a window. With the main door 78 in a closed position (i.e., positioned generally parallel with and adjacent to the frame of the front side 73 as shown in FIG. 1), the door 78 acts as a window, such that the operator can view forward so as to observe the environment, the loader arms 16, the attachment 18, etc. of the loader 10. When the main door 78 in an open position, as shown in FIG. 14b (i.e., positioned generally parallel with and adjacent to the top side 75), the main door 78 is actuated away from the front side 73 of the cab so as to present an open entryway 82 through which an operator can enter and exit the interior space of the cab 20.

With reference to FIG. 11, the bottom side 76 of the cab 20 may comprise a main platform 84 on which the seat 21 is positioned within the interior space of the cab 20. The bottom side 76 may additionally comprise a lowered platform 86 positioned forward of the main platform 84, and is configured to receive the feet of the operator of the loader 10 when the operator is seated on the seat 21 to operate the loader 10.

Figure 15A:
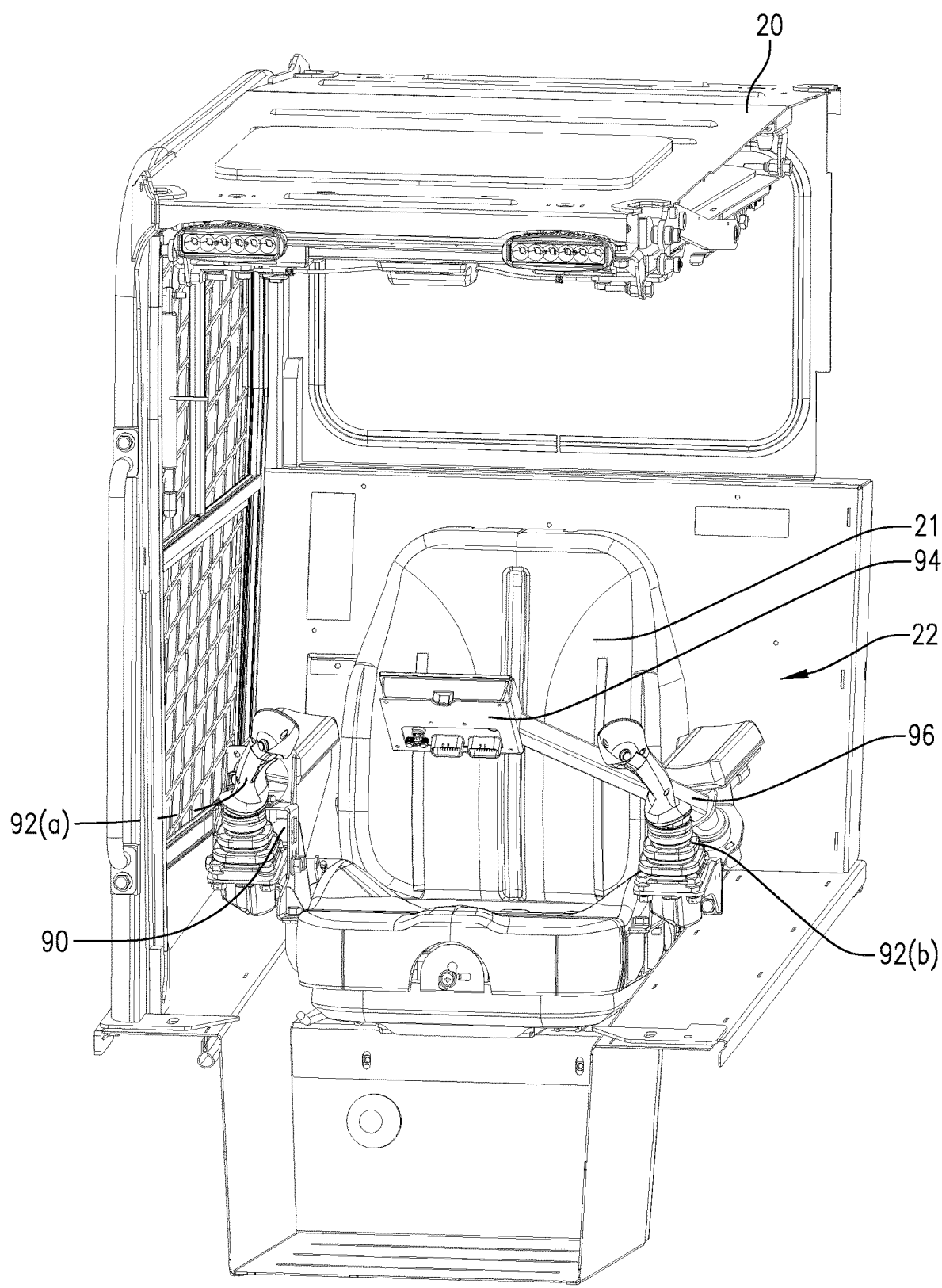
FIG. 15a is a front perspective view of a cab of the loader from FIGS. 1-8, with a portion of the cab cut away to illustrate user controls of the loader, and with a graphic display and lap bar in a lowered, operating position.
Figure 15B:
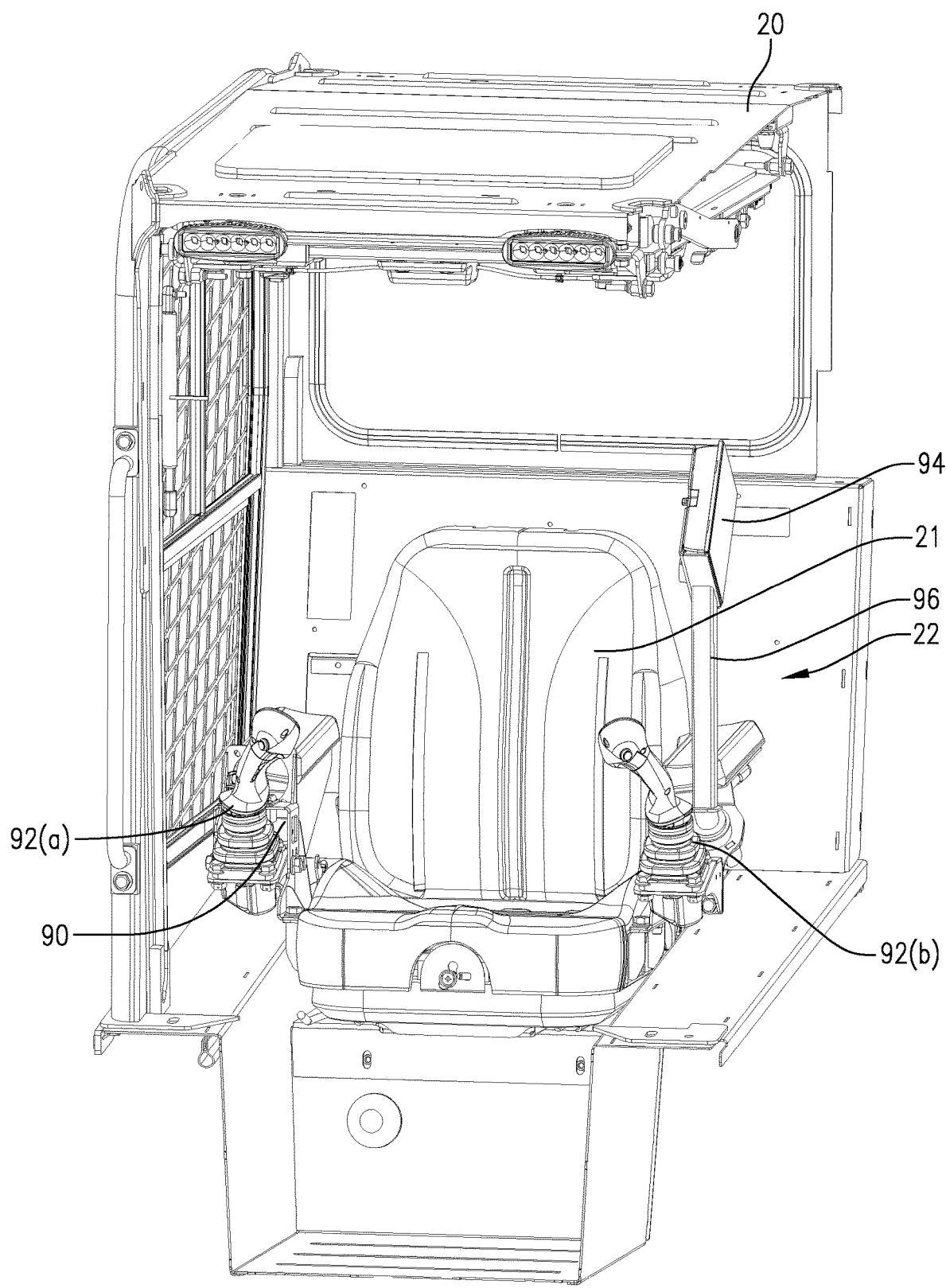
FIG. 15b is a front perspective view of the cab from FIG. 15a, with the graphic display and lap bar in a raised, non-operating position.

Turning to FIGS. 15a and 15b, the interior space of the cab 20 includes a plurality of user controls 22 (e.g., buttons, switches, levers, joysticks, touchscreen displays, etc.) that the operator can access and manipulate when the operator is seated on the seat 21. As such, the interior space of the cab 20 may be referred to as a control station. In more detail, the seat 21 may include a pair of armrests on which a user may rest his/her arms when seated in the seat 21 and operating the loader 10. A control panel 90 with one or more user controls 22, in the form of buttons, switches, or levers, may be positioned forward of one of the armrests. The operator may select such user controls 22 on the control panel 90 to perform various functions of the loader, such as (i) providing electrical power from the battery to various components of the loader, (ii) turning on/off vehicle lights of the loader, which may be positioned on exterior portions of the cab 20, (iii) starting the engine 30 of the loader 10.

In addition, a pair of joysticks 92 may be positioned forward of the armrests such that an operator can comfortably reach the joysticks 92 when seated in the seat 21. A first of the joysticks 92 may be a loader arm & attachment ("LA&A") joystick 92(a) for controlling actuation of the loader arms 16 (e.g., raising and lowering) and various hydraulically-operated functions of the attachment 18 that may be supported on the front of the loader arms 16. For example, the hydraulically-operated functions may include a tilt function for buckets or auxiliary hydraulic functions for other hydraulically-operated attachments 18 such as, e.g., bit rotation of a drill, bit actuation of a jack-hammer, rotation of a blade for a saw, rotation of multiple blades for a rotary cutter, brush rotation of a sweeper, etc. In addition, a second of the joysticks 92 may include a drive joystick 92(b), which is configured to control actuation of the tracks 50 (e.g., via control the drive motors 38 and the sprockets 58) for controlling overall movement (e.g., travel direction and speed) of the loader 10. In more detail, the drive joystick 92(b) may extend upward in front of the armrests, such that an operator may grasp and shift the drive joystick 92(b) so as to cause a corresponding movement of the loader 10. In certain embodiments, the loader 10 may include an electric-over-hydraulic ("EOH") system, such that the joysticks 92 may generate electric signals, which are configured to control hydraulic components of the loader 10.

In addition, the user controls 22 may include a graphic display 94 comprising an electronic display, such as a cathode ray tube, liquid crystal display, plasma, or touch screen that is operable to display visual graphics, images, text, etc. In embodiments in which the graphic display 94 is a touchscreen, the operator can manipulate the graphic display 94 to control various aspects and/or functionalities of the loader 10. The graphic display 94 may include, or may otherwise be associated with, one or more memory elements and processing elements. The memory elements may comprise non-transitory computer readable media and/or firmware, with a computer program stored thereon. The processing elements may comprise processors, CPUs, FPGAs, etc., which are configured to execute computer programs stored on the memory elements to perform various functions and features of the loader 10. It should be understood that certain of the loader's 10 functions and features discussed above and below may be performed by execution of the computer program by the processing elements. For example, the graphic display 94 may be configured to (by the processing elements executing the computer program stored on the memory elements) (i) obtain information from various components of the loader 10 (e.g., via sensors, actuators, timers, clocks, etc.) so as to present such information to the operator via the graphic display 94, and (ii) receive instructions from the operator (e.g., via the graphic display 94 or other of the control elements 24) to control various operations of the loader 10. For example, the graphic display 94 may present various graphical user interfaces (GUIs) that provides information to the operator and/or that facilitate interaction and control of the loader 10 by the operator. In embodiments in which the graphic display 94 is a touchscreen, the GUIs enable the operator to interact with the loader 10 by touching or pointing at display areas of the GUI. In some other embodiments, the operator will interact with the GUIs and/or the loader by manipulating interactable graphical icons/elements that are associated with the graphic display 94. The functionality of the graphic display 94 will be described in more detail below.

As illustrated in FIGS. 15a and 15b, the graphic display 94 may be coupled to an end of a rotatable lap bar 96. As such, the graphic display 94 and the lap bar 96 may be selectively shiftable between a raised, non-operable position (i.e., FIG. 15b) to and a lowered, operating position (i.e., FIG. 15a). In the raised, non-operable position, the graphic display 94 and the lap bar 96 are rotated away from the seat 21 such that space is provided for the operator to access or disembark from the seat 21. Once the operator has sat down in the seat 21, the graphic display 94 and the lap bar 96 can be rotated down towards the seat, such that the graphic display 94 is positioned in the lap area of the operator. As such, the operator can easily interact with the graphic display 94 to obtain information for and/or control functions of the loader 10. In some embodiments, the loader 10 may include a position sensor associated with the lap bar 96 and configured to determine if the lap bar 96 is in either the raised, non-operable position or the lowered, operating position. In some embodiments, certain functions of the loader 10 may not be operable unless the lap bar 96 is in the lowered, operating position. In addition, some embodiments may provide for the seat 21 to include a presence sensor configured to determine whether an operator is seated in the seat 21. In some embodiments, certain functions of the loader 10 may not be operable unless the operator is seated. The above-described position/presence sensors may comprise electronic sensors, such an inductive proximity switch configured to be triggered by the position of the lap bar and/or weight of the operator present in the seat 21. Thus, the loader 10 is configured to determine whether or not an operator is positioned within the seat 21 and with the lap bar 96 in the lowered, operating position. In some embodiments, certain operational features of the loader 10 may be restricted (e.g., starting the engine 30 of the loader, maneuvering the loader 10, actuating the loader arms 16 and/or attachment 18, etc.) if an operator is not present in the seat 21 and/or the lap bar 96 is not positioned in the lowered, operating position.

Lifting Assembly

In addition to the above, the loader 10 may be configured with a lifting assembly that facilitates the lifting and repositioning of the loader 10 using a separate piece of equipment. For example, a crane or other piece of heavy equipment (the "lifting machine") may be used to lift and move the loader 10, via the lifting assembly, into or off of transportation equipment, into or out of difficult to reach locations, etc. In certain embodiments, the lifting assembly may comprise lifting points in the form of a pair of openings or lift eyes 102 formed in the frame 12 of the loader 10, such as illustrated in FIGS. 1, 2, 4, and 5. Specifically, the loader 10 may comprise a left-side lift eye 102 positioned on the left side of the loader 10 and a right-side lift eye 102 positioned on the right side of the loader 10. Such lift eyes 102 may each comprise openings formed in and/or through the frame 12. The openings may be sized and/or shaped to permit lifting hooks associated with the lifting machine to be inserted therein. As such, the lifting machine can lift the loader 10 up away from the ground surface (i.e., with a full or entire weight of the loader 10 supported off/above the ground by the lifting machine) by way of the lifting hooks engaged with the lift eyes 102 (e.g., via chains, ropes, or straps that may extend between a lifting arm/boom/element of the lifting machine and the lifting hooks).

Notably, embodiments of the present invention are particularly configured to facilitate the lifting of the loader 10 off the ground in a balanced manner, only using the two lift eyes 102 on each lateral side of the loader 10, as illustrated in FIGS. 1, 2, 4, and 5. Specifically, when lifting the loader 10 using the two lift eyes 102, such that the full weight of the loader 10 is supported up off the ground (e.g., by the lifting machine having engaged two lifting hooks with the lift eyes 102), the loader 10 may be configured to tilt less than 40°, less than 30°, less than 25°, less than 20°, less than 15°, and/or less than 10° from horizontal. Alternatively, or in addition, when lifting the loader 10 using the two lift eyes 102 such that the full weight of the loader 10 is supported up off the ground (e.g., by the lifting machine having engaged two lifting hooks with the lift eyes 102), the loader 10 may be configured to tilt at least 5°, at least 10°, at least 12.5°, or at least 15° from horizontal. It is understood that such above-described tilting may be a forward/rearward tilting of the loader 10 about a laterally extending rotational axis, such as an axis that extends laterally through the lift point axis (LPA) of the loader 10.

Such balanced lifting of the loader 10 may be facilitated by the specific positioning of the lift eyes 10 on the loader 10. In general, as illustrated in FIGS. 1, 2, 4, and 5, the lift eyes 102 will be integrated as part of the frame 12 of the loader 10, on each of the left side 23 and right side 24 of the frame 12. As such, the lift eyes 102 may be laterally spaced apart from each other across a width of the loader 10, but may be aligned longitudinally along a length of the loader 10. In more detail, the lift eyes 102 may be formed near the top edges of the rearward portion 12(b) of the frame 12. Specifically, in some embodiments, the lift eyes 102 may be positioned at the top edges of the frame 12, rearward of the cab 20 on either lateral side of the cab 20. In some embodiments, the lift eyes 102 may be positioned below the top side 75 of the cab.

Figure 16:
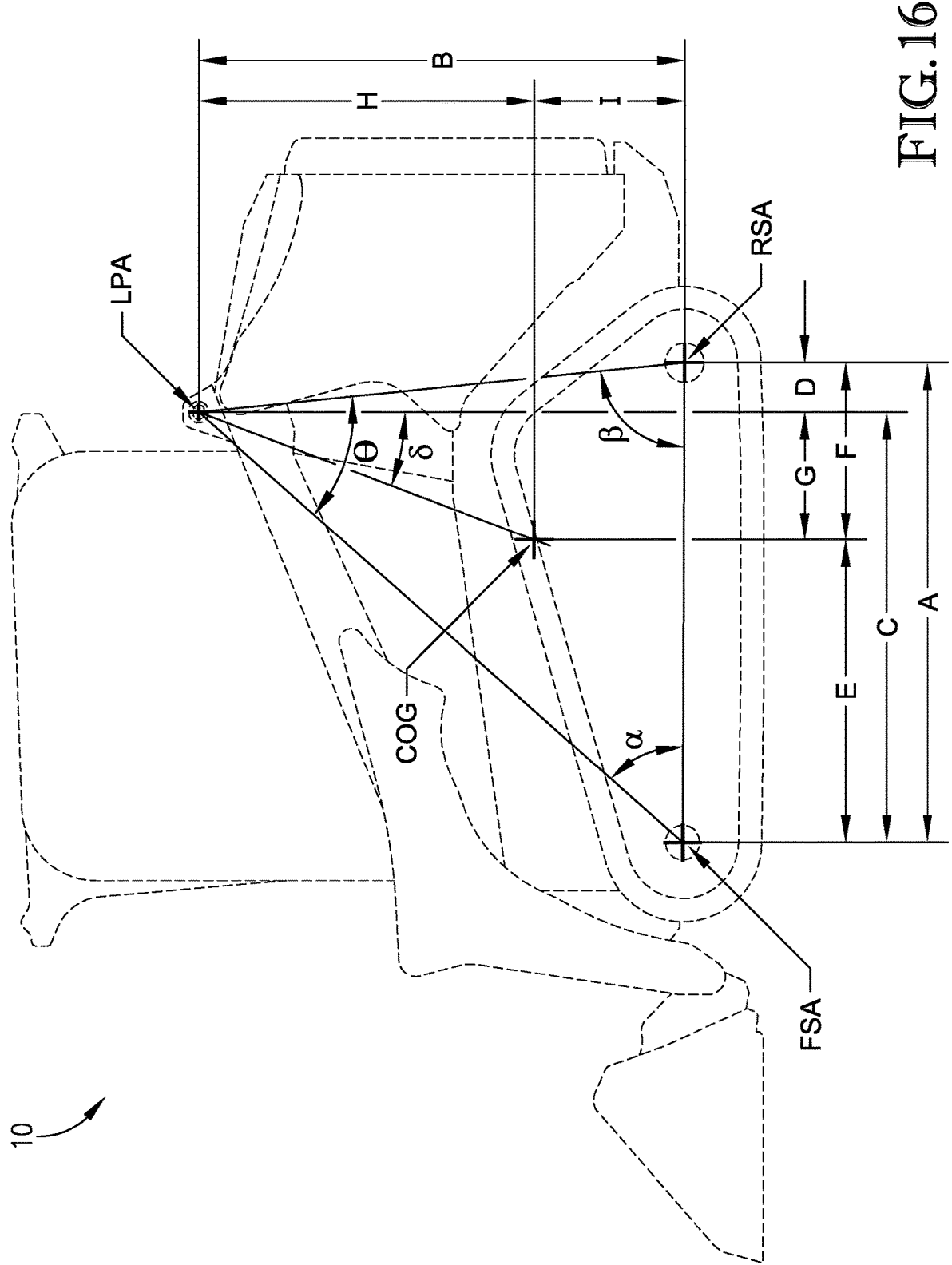
FIG. 16 is a side elevation schematic view of the loader from FIGS. 1-8, illustrating various distances and angular measurements between components of the loader.

In more detail still, FIG. 16 is a side elevation view of the loader 10, which illustrates various relative dimensions and/or distances between components of the loader 10. FIG. 16 illustrates distances and angular measurements on the left side of the loader 10. But it should be understood that the corresponding distances and angular measurements on the right side of the loader 10 are equivalent to those discussed below for the left side. In more detail, the distance "A" illustrates a horizontal distance (extending generally longitudinally) between a center and/or rotational axis of the front idler wheel 54 (referred to herein and shown in FIG. 16 as a "front support axis" or "FSA") and a center and/or rotational axis of the rear idler wheel 54 (referred to herein and shown in FIG. 16 as a "rear support axis" or "RSA"). The distance "B" illustrates a vertical distance between the center and/or rotational axis of the front and/or rear idler wheels 54, e.g., FSA or RSA, and a center of the lift eye 102 (referred to herein as a "lift point axis" or "LPA"). The distance "C" illustrates a horizontal distance (extending generally longitudinally) between the FSA and the LPA. The distance "D" illustrates a horizontal distance (extending generally longitudinally) between the RSA and the LPA.

Furthermore, a longitudinal and vertical position of a center of gravity of the loader 10 (i.e., a center of mass and/or an average location of the weight of the loader 10) is illustrated in FIG. 16 by the reference "COG." The distance "E" illustrates a horizontal distance (extending generally longitudinally) between the FSA and the COG. The distance "F" illustrates a horizontal distance (extending generally longitudinally) between the RSA and the COG. The distance "G" illustrates a horizontal distance (extending generally longitudinally) between the COG and the LPA. The distance "H" illustrates a vertical distance between the COG and the LPA. The distance "I" illustrates a vertical distance between the COG and the FSA and/or RSA.

The angle $\alpha$ illustrates an angular measurement (in degrees) between a line extending from the FSA to the RSA and a line extending from the FSA to the LPA. The angle $\beta$ illustrates an angular measurement (in degrees) between a line extending from the RSA to the FSA and a line extending from the RSA to the LPA. The angle $\theta$ illustrates an angular measurement (in degrees) between a line extending from the LPA to the FSA and a line extending from the LPA to the RSA. And the angle $\delta$ illustrates an angular measurement (in degrees) between a line extending from the LPA to the COG and a line extending in the vertical direction.

In certain embodiments, the distance A may be from 25 to 75 inches, from 35 to 65 inches, from 45 to 55, and/or about 50 inches. The distance B may be from 25 to 75 inches, from 35 to 65 inches, from 45 to 55, and/or about 50 inches. A ratio A:B may be from 0.5 to 2, from 0.75 to 1.5, from 0.85 to 1.25, and/or about 1. The distance C may be from 20 to 90 inches, from 30 to 75 inches, from 40 to 50, and/or about 44 inches. The distance D may be from 1 to 16 inches, from 2 to 12 inches, from 4 to 8, and/or about 6 inches. A ratio C:D may be from 3 to 15, from 5 to 10, from 6.5 to 8.5, and/or about 7.3. The distance E may be from 15 to 60 inches, from 20 to 45 inches, from 25 to 35, and/or about 31 inches. The distance F may be from 10 to 40 inches, from 12 to 35 inches, from 15 to 25, and/or about 19 inches. A ratio E:F may be from 0.5 to 3, from 1 to 2.5, from 1.25 to 1.75, and/or about 1.5. The distance G may be from 6 to 30 inches, from 10 to 24 inches, from 12 to 18, and/or about 14 inches. The distance H may be from 15 to 60 inches, from 20 to 50 inches, from 30 to 40, and/or about 33 inches. The distance I may be from 8 to 30 inches, from 10 to 26 inches, from 12 to 20, and/or about 17 inches. A ratio H:I may be from 1.2 to 4, from 1.6 to 2.5, from 1.8 to 2.2, and/or about 1.95.

The angle $\alpha$ may be from 30 to 90 degrees, from 40 to 70 degrees, from 50 to 60 degrees, and/or about 55 degrees. The angle $\beta$ may be from 55 to 105 degrees, from 65 to 95 degrees, from 75 to 85 degrees, and/or about 80 degrees. The angle $\theta$ may be from 20 to 80 degrees, from 30 to 60 degrees, from 40 to 50 degrees, and/or about 45 degrees. The angle $\delta$ may be from 0 to 30 degrees, from 5 to 23 degrees, from 10 to 18 degrees, and/or about 15 degrees.

Figure 17:
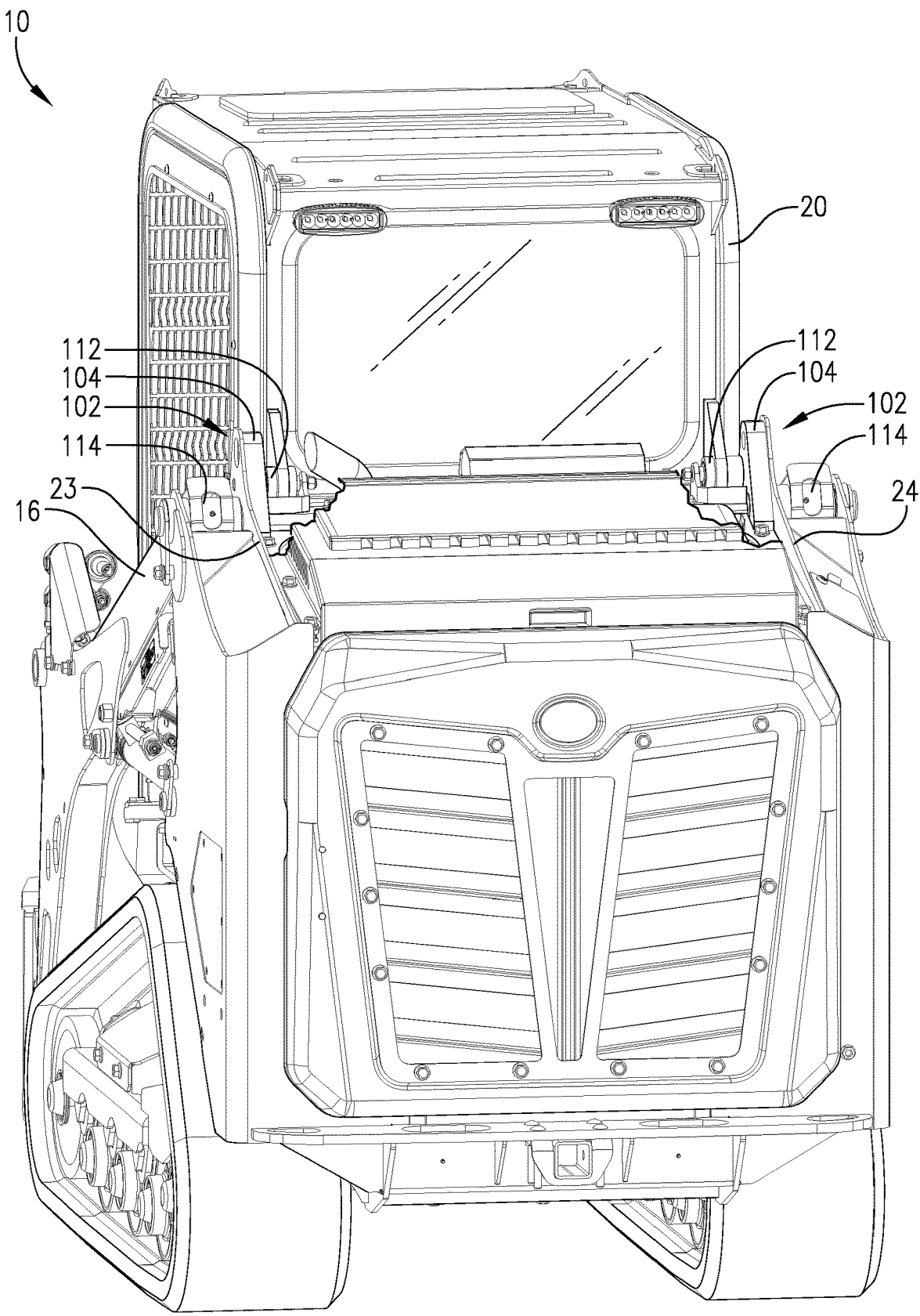
FIG. 17 is a rear perspective view of the loader from FIGS. 1-8, particularly illustrating a pair of lift eyes of the loader.

In some additional embodiments, the lifting assembly may include one or more structural reinforcement elements to aid in supporting loads and/or distributing loads about the loader 10. For example, as illustrated in FIG. 17 that shows the loader 10 with a left-side lift eye 102 and a right-side lift eye 102, each of the lift eyes 102 may include otherwise be associated with a reinforcement plate 104. Such reinforcement plates 104 may include an opening that matches the opening of the lift eyes 102 formed in the frame 12 of the loader. As such, when the reinforcement plates 104 are rigidly secured to the frame 12, the reinforcement plates 104 may form part of the lift eyes 102.

The reinforcement plate 104 may be formed from a thicker and stronger material than the material from which the frame 12 is formed. For instance, the frame 12 may be formed from AISI 1010 steel that is generally about 0.300 inches thick. In contrast, the reinforcement plate 104 may be formed from ASTM A5725 steel (Grade 50) that is generally about 1.0 inches thick. As such, the reinforcement plate 104 may be formed from a material having a higher carbon content, a higher yield strength, and/or a higher tensile strength than a material from which the frame 12 is formed. Although the reinforcement plates 104 may be formed with a generally constant thickness, it is contemplated that the reinforcement plates 104 may alternatively have a variable thickness about its length and/or width. Furthermore, in some embodiments, the reinforcement plates 104 may comprise multiple individual plates stacked together.

Nevertheless, the reinforcement plates 104 may be formed in various shapes and/or sizes. However, in some embodiments, the reinforcement plates 104 should each be sized so as to (i) include a through hole that forms part of the lifting point of the corresponding lift eye 102, (ii) supports a pivot/rotation connection of an associated lift arm 16, and/or (ii) supports a pivot/rotation connection of the cab 20. Thus, as shown in FIGS. 18-21, each reinforcement plate 104 may have a generally triangular shape with a bottom portion having a larger width than an upper portion. In such embodiments, as perhaps best illustrated in FIGS. 20 and 21, each reinforcement plate 104 may include a top through hole or opening (referred to herein as a "lifting opening 106") located through the top portion of the reinforcement plate 104. The lifting opening 106 is configured to be aligned with the through hole or opening formed in the frame 12 that comprises the lift point of the corresponding lift eye 102. As such, the lifting openings 106, forming part of the lift eyes 102, are configured to support the full weight of the loader 10 when the loader 10 is lifted off the ground.

In addition, each reinforcement plate 104 may include a first bottom through hole or opening (referred to herein as a "cab pivot opening 108") and a second through hole or opening (referred to herein as a "loader arm attachment opening 110"), each positioned through the bottom portion of the reinforcement plate 104. The cab pivot openings 110 may be configured to at least partially (or fully) support the cab 20 on the frame 12. And the loader arm attachment openings 110 may be configured to at least partially (or fully) support the loader arms 16 on the frame 12.

Figure 18:
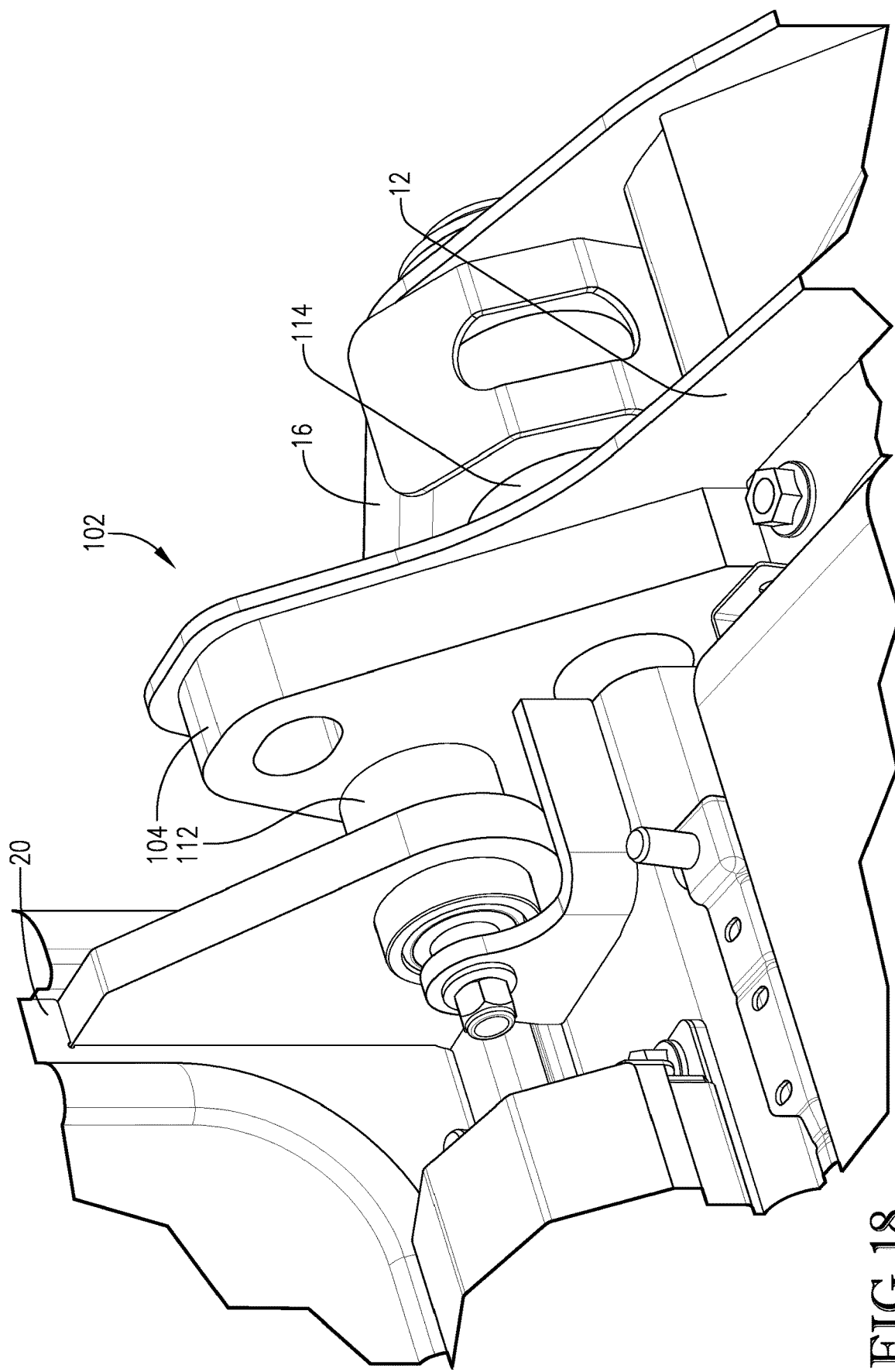
FIG. 18 is an enlarged view of one of the lift eyes of the loader from FIG. 17, particularly illustrating the lift eye including a reinforcement plate.
Figure 19:
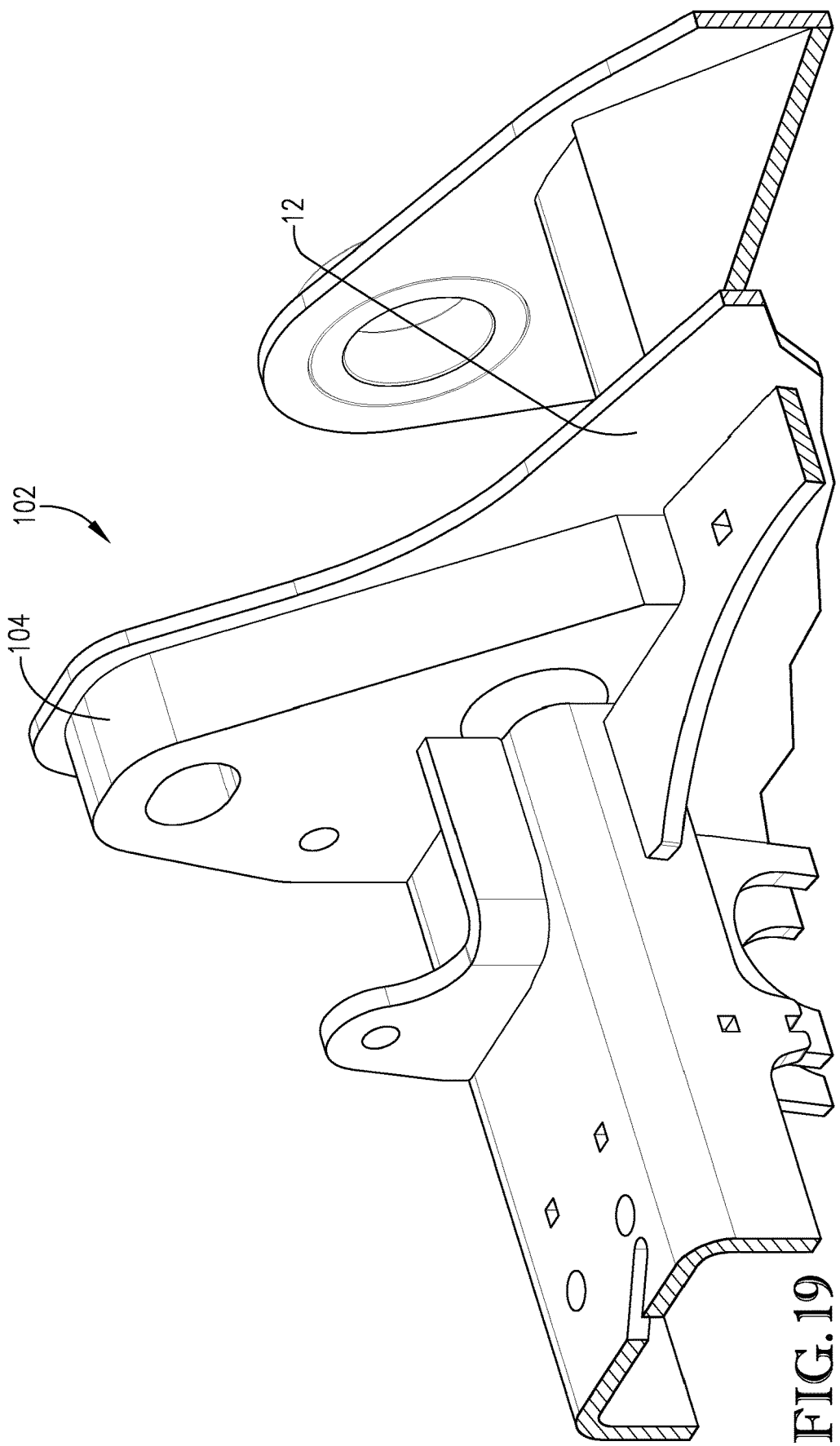
FIG. 19 is another view of the lift eye from FIG. 18, portions of the loader removed to further illustrate the lift eye and/or the reinforcement plate.
Figure 20:
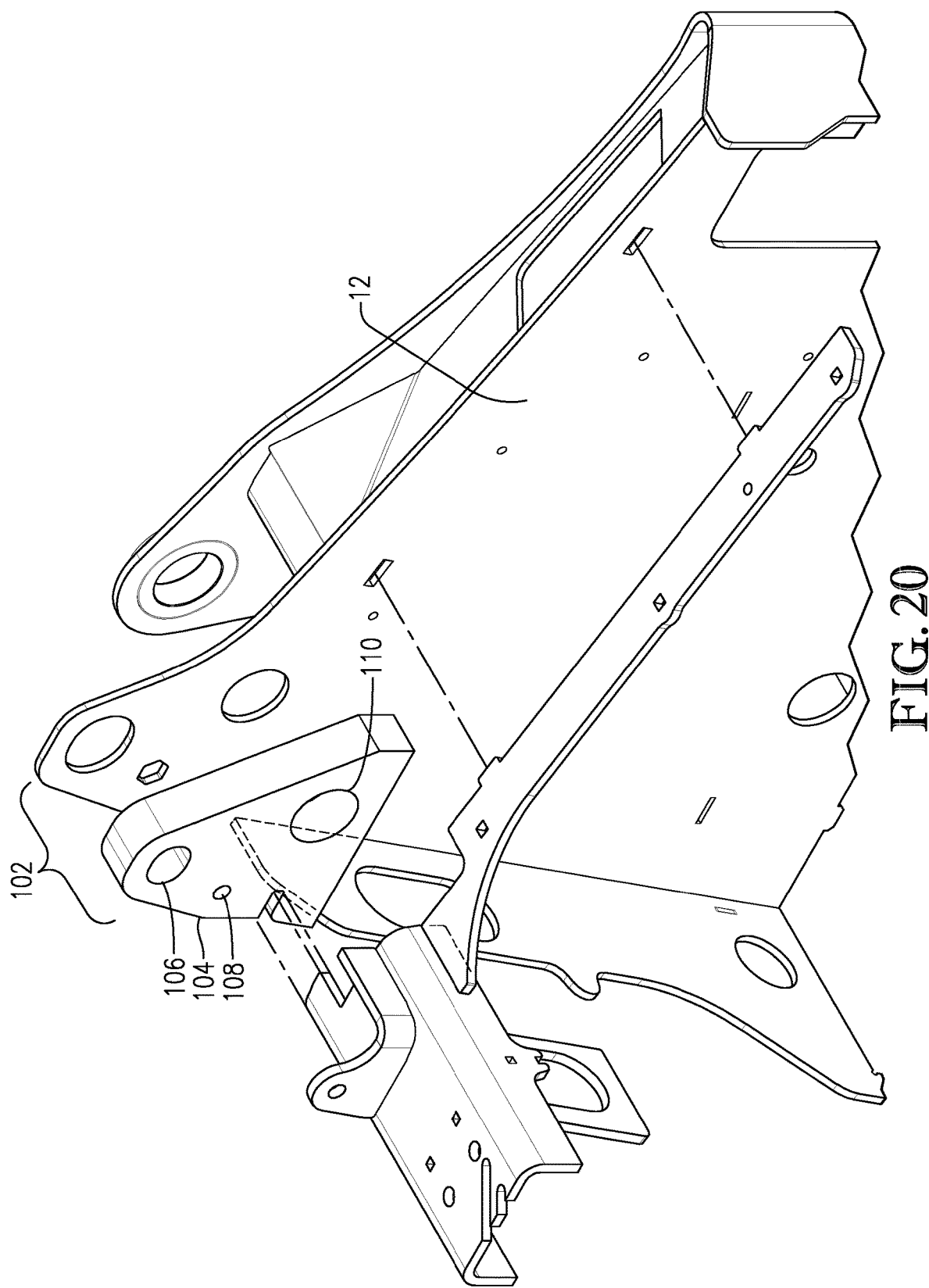
FIG. 20 is an interior side view of the lift eye from FIG. 19, with the reinforcement plate shown separated from a frame of the loader.
Figure 21:
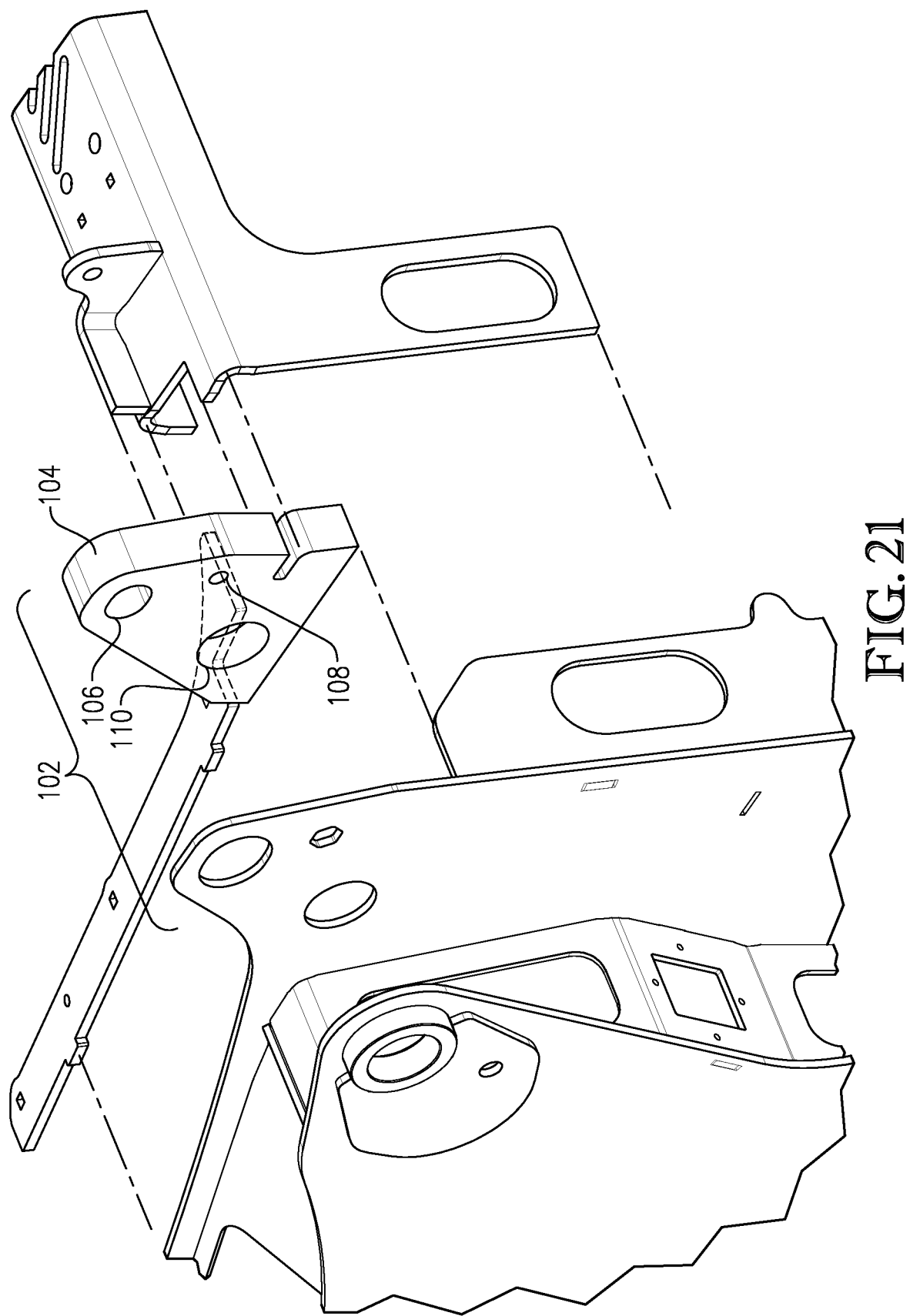
FIG. 21 is an exterior side view of the lift eye from FIG. 20.

Each of the cab pivot openings 108 may be aligned with a corresponding through hole formed in the frame 12, and may be configured to support a pivot/rotation connection (referred to herein as "cab pivot connection 112", as illustrated in FIGS. 17 and 18) between the cab 20 and the frame 12, such that the cab 20 is configured to rotate with respect to the frame 12 between the open and closed positions via the cab pivot connections 112. Thus, the cab pivot connections 112 may engage with the reinforcement plates 104 (i.e., into the cab pivot openings 108) from interior sides of the reinforcement plates 104.

Each of the loader arm attachment opening 110 may be aligned with a corresponding through hole formed in the frame 12, and may be configured to support a pivot/rotation connection (referred to herein as "loader arm connection 114", as illustrated in FIGS. 17 and 18) between one of the loader arms 16 and the frame 12, such that the loader arm 16 is configured to rotate between lowered and raised positions via the loader arm connection 114. Thus, the loader arm connection 114 may engage with the reinforcement plates 104 (i.e., into the loader arm attachment opening 110) from exterior portions of the reinforcement plates 104. Given that the cab pivot connection 112 are positioned forward (in a longitudinal direction) from the loader arm connection 114, the cab pivot openings 108 may be positioned forward (in a longitudinal direction) from the loader arm attachment openings 110 on the reinforcement plates 104. Furthermore, the lifting openings 106 will generally be positioned above the cab pivot openings 108 and/or the loader arm attachment openings 110.

To facilitate such alignment between the lift opening 106, the cab pivot opening 108, and the loader arm attachment opening 110 and corresponding through holes or openings formed in the frame 12, each of the reinforcement plates 104 may be properly aligned and rigidly attached to the interior surface of the frame 12. Specifically, one reinforcement plate 104 may be rigidly attached to the left side 23 of the frame 12, and another reinforcement plate 104 may be rigidly attached to the right side 24 of the frame 12. Such rigid attachment may be facilitated by welding (e.g., spot welding or a continuous weld) around the edges of the reinforcement plates 104 and the interior surfaces of the frame 12.

In view of the above, embodiments provide a lifting assembly that facilitates efficient lifting of the loader 10 (e.g., by a crane or other lifting machine), as well as provides a structurally sound connection area for multiple, large/heavy components of the loader 10 to operably engage with the frame 12. In more detail, embodiments of the present invention comprise a loader 10 with integral lifting points (e.g., the lift eyes 102) from which the full weight of the loader 10 can be supported when the loader 10 is lifted off the ground by a crane or other lifting machines. Such a loader 10 may comprise a frame 12 and a pair of loader arms 16 supported on the frame 12 and shiftable relative to the frame 12 between a raised position and a lowered position. The loader 10 may additionally comprise a pair of reinforcing plates 104 rigidly attached to the frame on opposite sides of the frame 12. Each of the reinforcement plates 104 may include a loader arm attachment opening 110 and a lifting opening 106. The loader arm attachment openings 110 at least partially support the loader arms 16 on the frame 12.

And the lifting openings 106 are configured to support the full weight of the loader 10 when the loader 10 is lifted off the ground.

Figure 22:
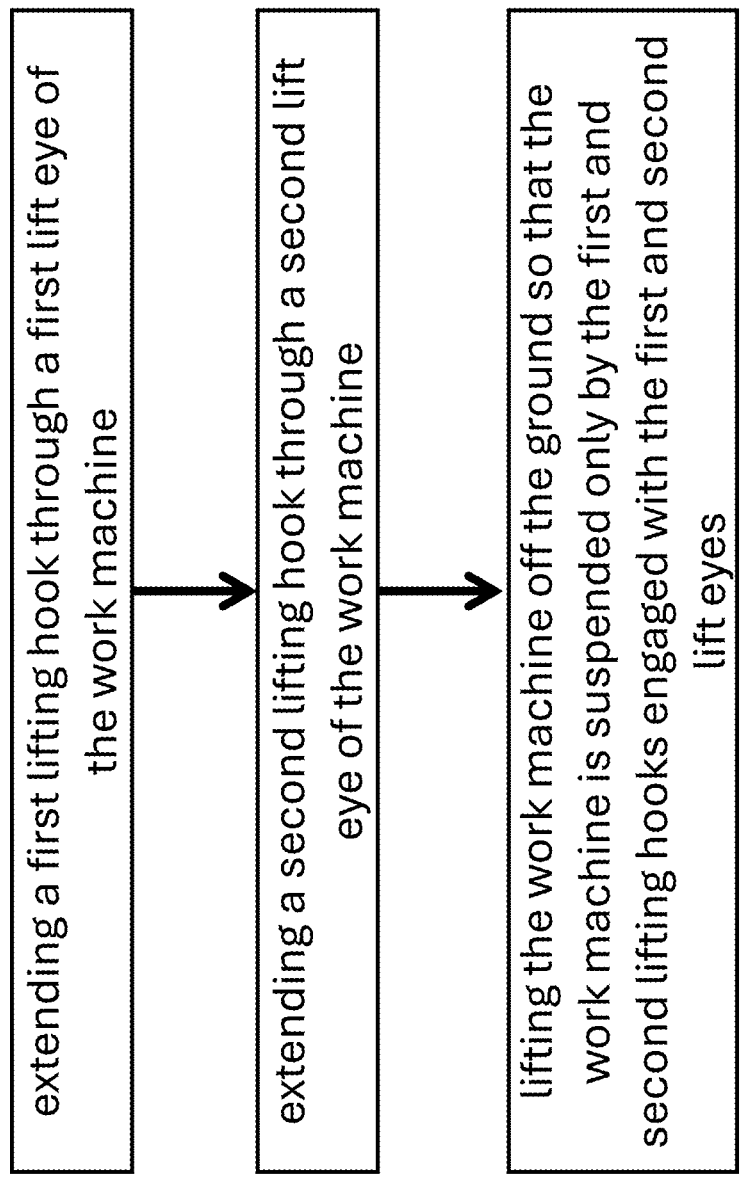
FIG. 22 is a flowchart illustrating a method of lifting a work machine according to embodiments of the present invention.

To lift the loader 10, as illustrated by FIG. 22, an operator may extend a first lifting hook through a first lift eye 102 of the loader 10 and may extend a second lifting hook through a second lift eye 102 of the loader 10. Such lifting hooks may be connected to a crane or other lifting machine via ropes, chains, cables, or the like. As such, the crane or other lifting machine may lift the loader 10 off the ground so that the loader 10 is suspended only by the first and second lift eyes 102 (i.e., via engagement between the first and second lifting hooks and corresponding lift eyes 102). During such lifting, the loader 10 may be balanced so as to tilt no more than 15° from horizontal.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:

1. A work machine comprising:
   a frame having laterally spaced sides and longitudinally spaced front and rear ends;
   at least one loader arm supported on the frame and shiftable relative to the frame between a raised position and a lowered position; and
   a pair of laterally spaced, longitudinally aligned lift eyes, wherein a full weight of the work machine can be suspended from only the pair of lift eyes,
   wherein the work machine includes a cab configured to receive an operator of the work machine, wherein the pair of lift eyes are positioned longitudinally rearward of the cab and below a top side of the ca,
   wherein when suspended only from the pair of lift eyes, the work machine is configured to tilt less than 15 degrees from horizontal about a laterally extending rotational axis that extends through the pair of lift eyes,
   wherein the work machine is configured such that prior to being suspended by the pair of lift eyes a line extending from the rotational axis to a center of gravity of the work machine forms an angle $\delta$ with respect to a vertical axis, and wherein the angle $\delta$ is between 0 and 30 degrees.

2. The work machine of claim 1, wherein the pair of lift eyes are positioned vertically above a center of gravity of the work machine.

3. The work machine of claim 2, wherein the pair of lift eyes are positioned longitudinally rearward of a center of gravity of the work machine.

4. The work machine of claim 1, further comprising a pair of reinforcement plates, with each of the reinforcement plates at least partially defining one of the lift eyes.

5. The work machine of claim 4, wherein the pair of reinforcement plates are welded to the frame of the work machine.

6. The work machine of claim 4, wherein the pair of reinforcement plates are formed from a higher tensile strength material than a material from which the frame is formed.

7. The work machine of claim 1, wherein the work machine comprises a loader.

8. The work machine of claim 7, wherein the loader comprises a compact track loader.

9. A work machine having integral lifting points from which a full weight of the work machine can be supported when the work machine is lifted off the ground by a crane or other lifting machine, the work machine comprising:
  a frame;
  a pair of or loader arms supported on the frame and shiftable relative to the frame between a raised position and a lowered position;
  a pair of reinforcing plates rigidly attached to the frame on opposite sides of the frame,
  wherein each of the reinforcement plates includes a loader arm attachment opening and a lifting opening, such that the work machine includes a pair of lifting openings,
  wherein the loader arm attachment openings at least partially support the loader arms on the frame,
  wherein the full weight of the work machine can be suspended from only the pair of lifting openings when the work machine is lifted off the ground,
  wherein the work machine includes a cab configured to receive an operator of the work machine, wherein the pair of lifting openings are positioned longitudinally rearward of the cab and below a top side of the cab,
  wherein when suspended only from the pair of lifting openings, the work machine is configured to tilt less than 15 degrees from horizontal about a laterally extending rotational axis that extends through the lifting openings,
  wherein the work machine is configured such that prior to being suspended by the pair of lifting openings a line extending from the rotational axis to a center of gravity of the work machine forms an angle δ with respect to a vertical axis, and wherein the angle δ is between 0 and 30 degrees.

10. The work machine of claim 9, wherein the cab is supported on the frame and rotatable relative to the frame via a cab pivot connection, wherein each reinforcement plate includes a cab pivot opening, wherein the cab pivot openings at least partially support the cab on the frame.

11. The work machine of claim 10, wherein for each of the reinforcement plates, the lifting opening is positioned vertically above the loader arm attachment opening and/or the cab pivot opening, and wherein for each of the reinforcement plates, the loader arm attachment opening is positioned longitudinally rearward of the cab pivot opening.

12. The work machine of claim 9, wherein the pair of reinforcement plates are welded to the frame of the work machine.

13. The work machine of claim 9, wherein the pair of reinforcement plates are formed from a higher tensile strength material than a material from which the frame is formed.

14. A method of lifting a work machine, said method comprising:
  (a) extending a first lifting hook through a first lift eye of the work machine;
  (b) extending a second lifting hook through a second lift eye of the work machine; and
  (c) lifting the work machine off the ground so that the work machine is suspended only by the first and second lifting hooks engaged with the first and second lift eyes,
  wherein the work machine includes a cab configured to receive an operator of the work machine, wherein the first and second lift eyes are positioned longitudinally rearward of the cab and below a top side of the cab,
  wherein upon said lifting of step (c), the work machine is configured to tilt less than 15 degrees from horizontal about a laterally extending rotational axis that extends through the lift eyes,
  wherein prior to said lifting of step (c) a line extending from the rotational axis to a center of gravity of the work machine forms an angle δ with respect to a vertical axis, and wherein the angle δ is between 0 and 30 degrees.

* * * * *